(12) United States Patent
Sasaki et al.

(10) Patent No.: US 7,119,989 B2
(45) Date of Patent: Oct. 10, 2006

(54) THIN-FILM MAGNETIC HEAD, METHOD OF MANUFACTURING THE SAME, HEAD GIMBAL ASSEMBLY, AND HARD DISK DRIVE

(75) Inventors: Yoshitaka Sasaki, Milpitas, CA (US); Takehiro Kamigama, Kwai Chung (HK)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 428 days.

(21) Appl. No.: 10/781,827

(22) Filed: Feb. 20, 2004

(65) Prior Publication Data

US 2005/0185333 A1 Aug. 25, 2005

(51) Int. Cl.
G11B 5/17 (2006.01)
G11B 5/147 (2006.01)

(52) U.S. Cl. ........................ 360/126; 360/123
(58) Field of Classification Search ............... None
See application file for complete search history.

(56) References Cited

U.S. PATENT DOCUMENTS

| 5,995,342 | A | 11/1999 | Cohen et al. | |
| 6,043,959 | A | 3/2000 | Crue et al. | |
| 6,191,916 | B1 | 2/2001 | Sasaki | |
| 6,459,543 | B1 | 10/2002 | Sasaki | |
| 6,466,401 | B1 * | 10/2002 | Hong et al. | 360/123 |
| 6,922,311 | B1 * | 7/2005 | Kobayashi | 360/126 |
| 6,963,470 | B1 * | 11/2005 | Sato | 360/126 |

FOREIGN PATENT DOCUMENTS

| JP | A 2000-311311 | 11/2000 |
| JP | A 2003-282324 | 10/2003 |

OTHER PUBLICATIONS

U.S. Appl. No. 10/397,365, Kamijima, filed Mar. 27, 2003.

* cited by examiner

Primary Examiner—R. S. Tupper
(74) Attorney, Agent, or Firm—Oliff & Berridge, PLC

(57) ABSTRACT

A thin-film magnetic head comprises first and second magnetic pole groups, magnetically connected to each other, having respective magnetic pole parts opposing each other on a side of a medium-opposing surface; a recording gap layer formed between the magnetic pole parts; and a thin-film coil insulated from the first and second magnetic pole groups and wound helically about at least one of them or flatly spirally wound about a junction connecting the first and second magnetic pole groups to each other; which are laminated on a substrate. The thin-film coil comprises a first conductor group having a plurality of inner conductor parts disposed between the first and second magnetic pole groups, and a second conductor group having a plurality of outer conductor parts disposed outside the second magnetic pole group or junction. The first conductor group has an insulating contact structure in which the inner conductor parts are in contact with each other by way of an insulating film. An inner relaxing part comprising a material softer than at least one of the first, second conductor groups and the first, second magnetic pole groups and being in contact with the first conductor group by way of an insulating film is provided.

18 Claims, 33 Drawing Sheets

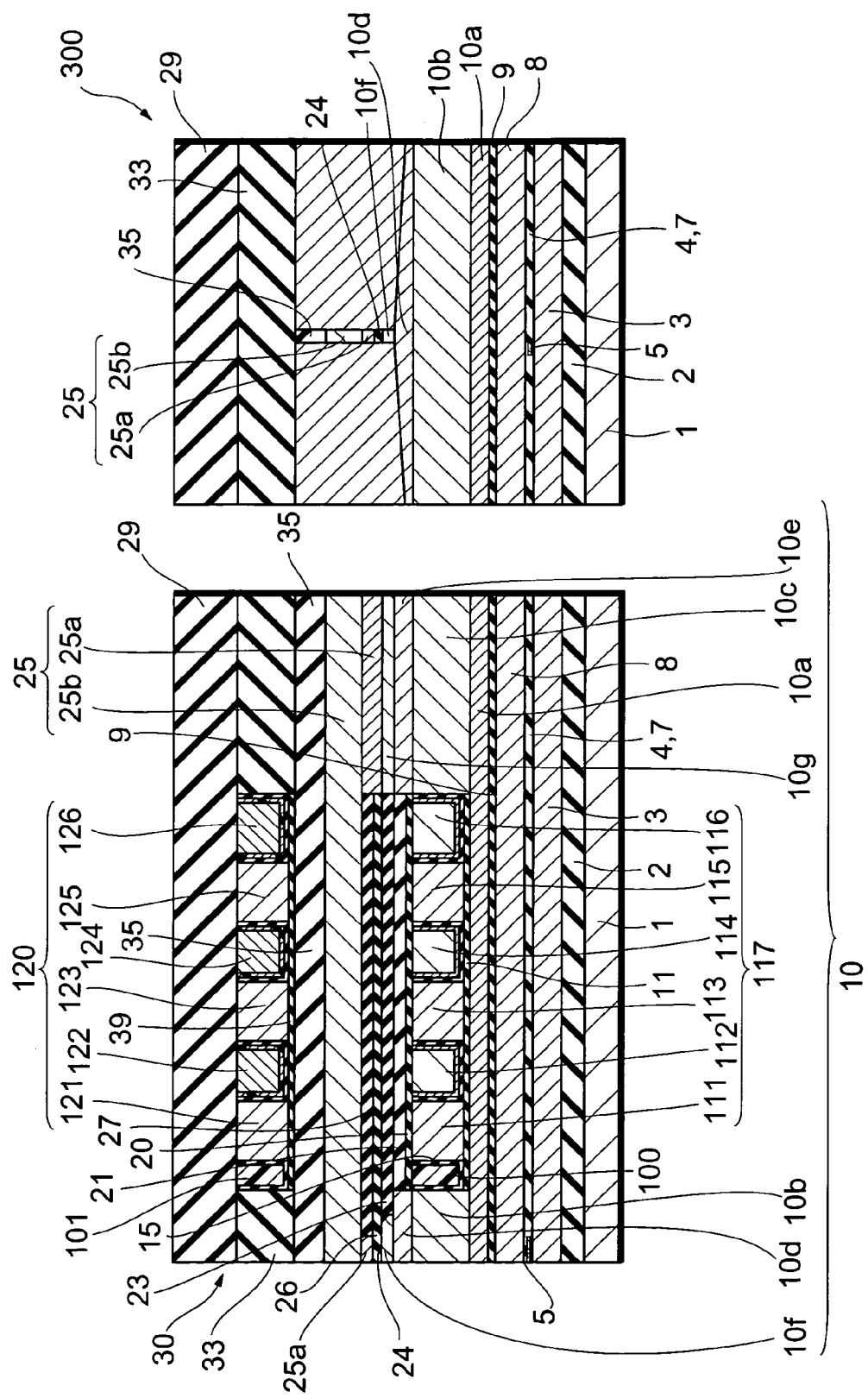

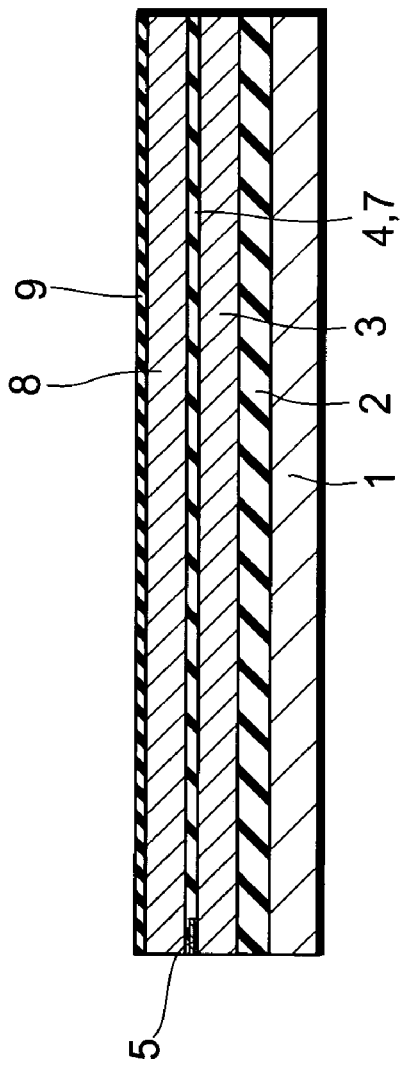

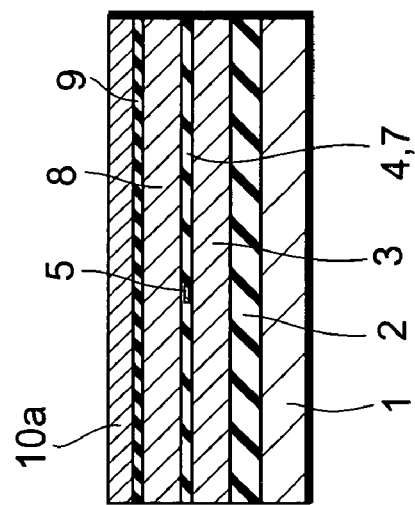
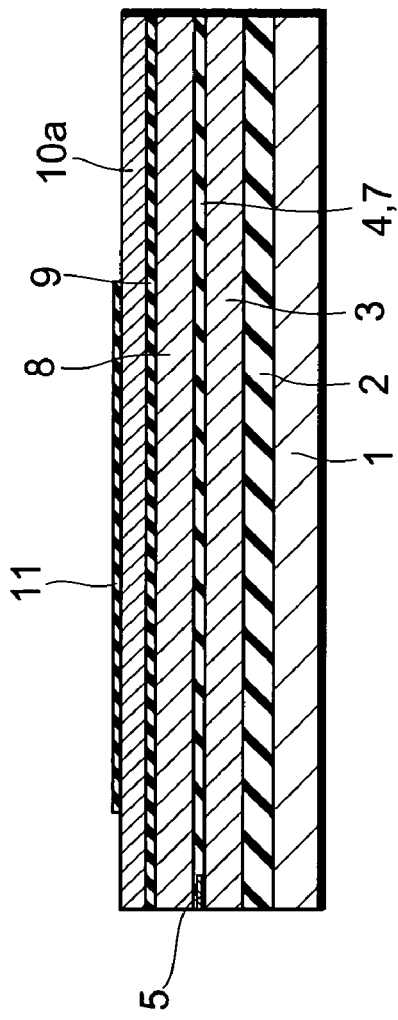

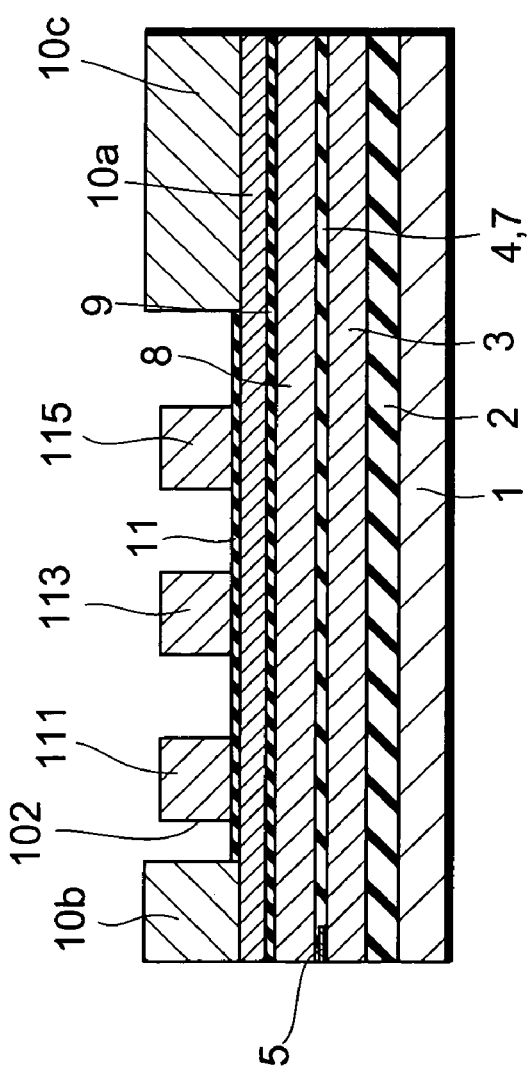

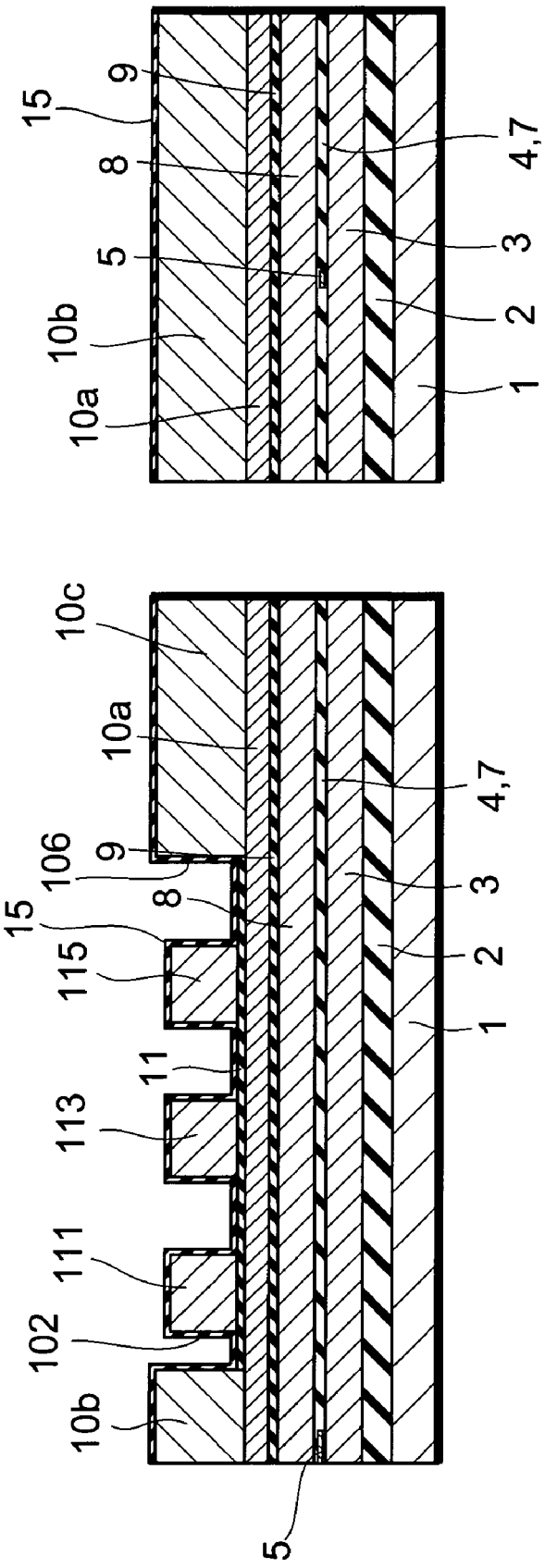

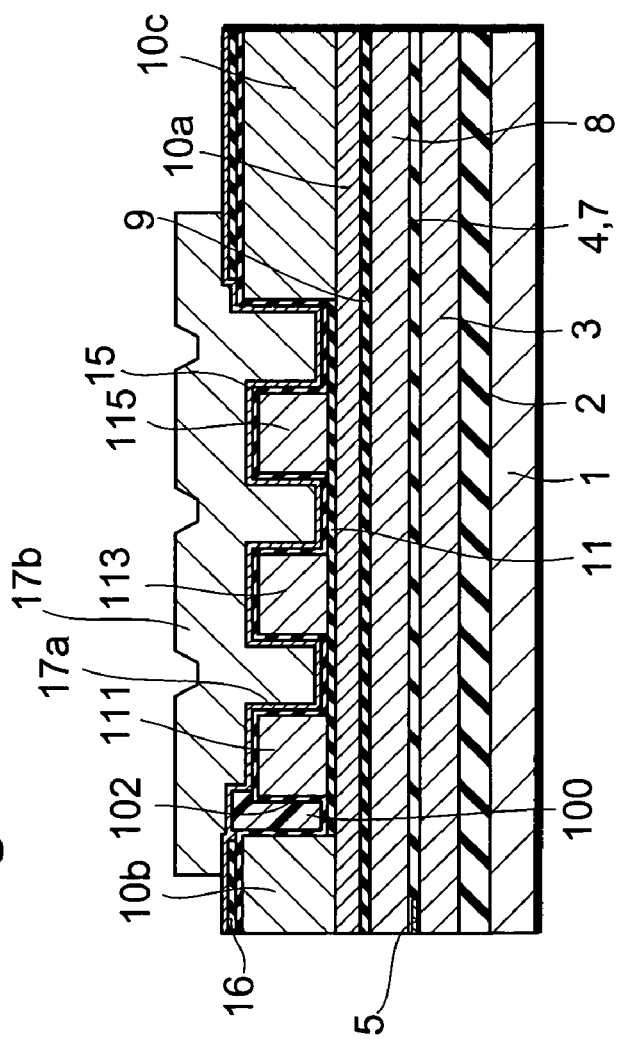

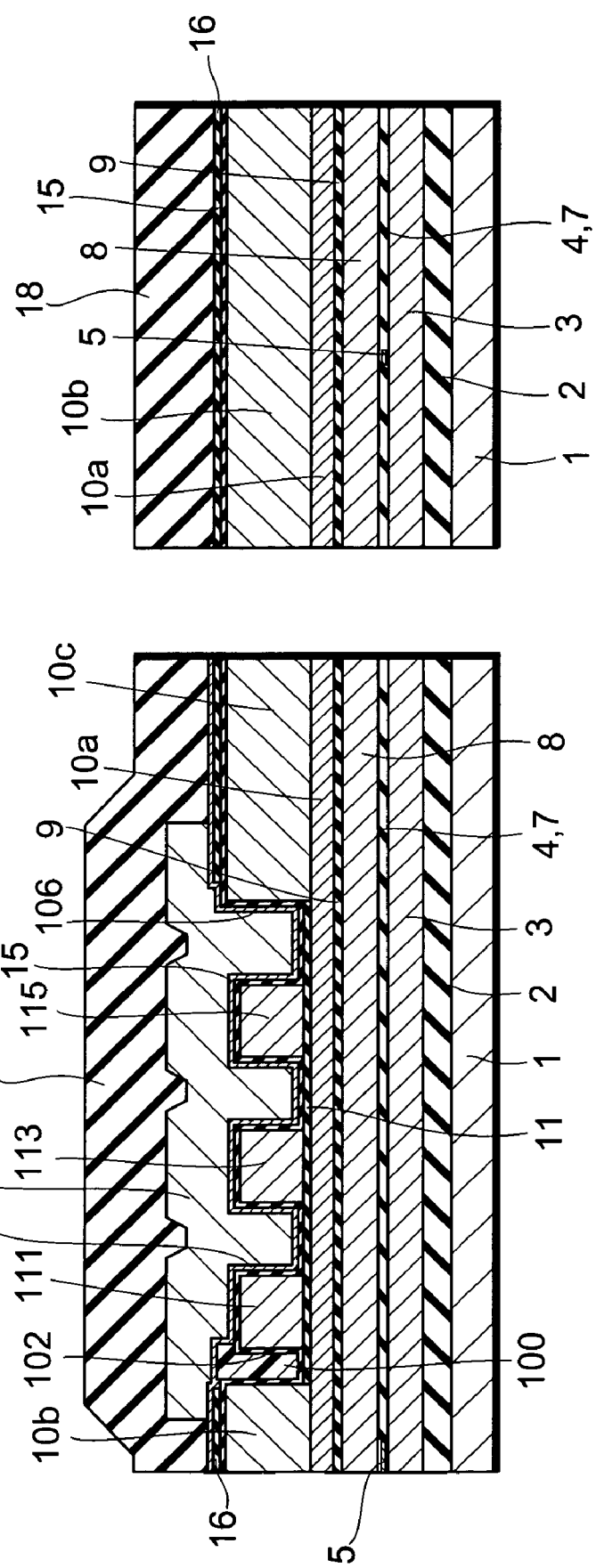

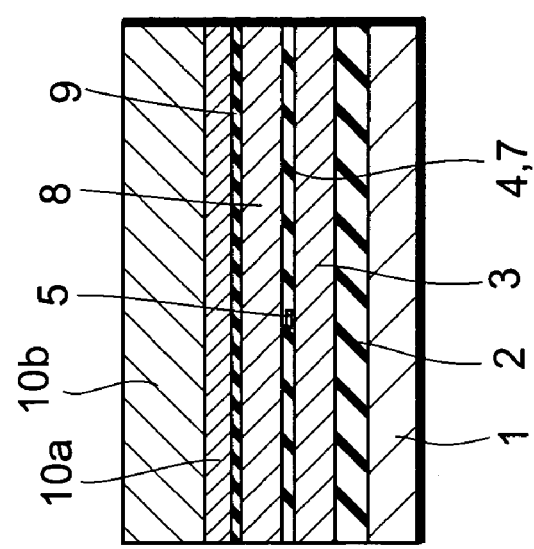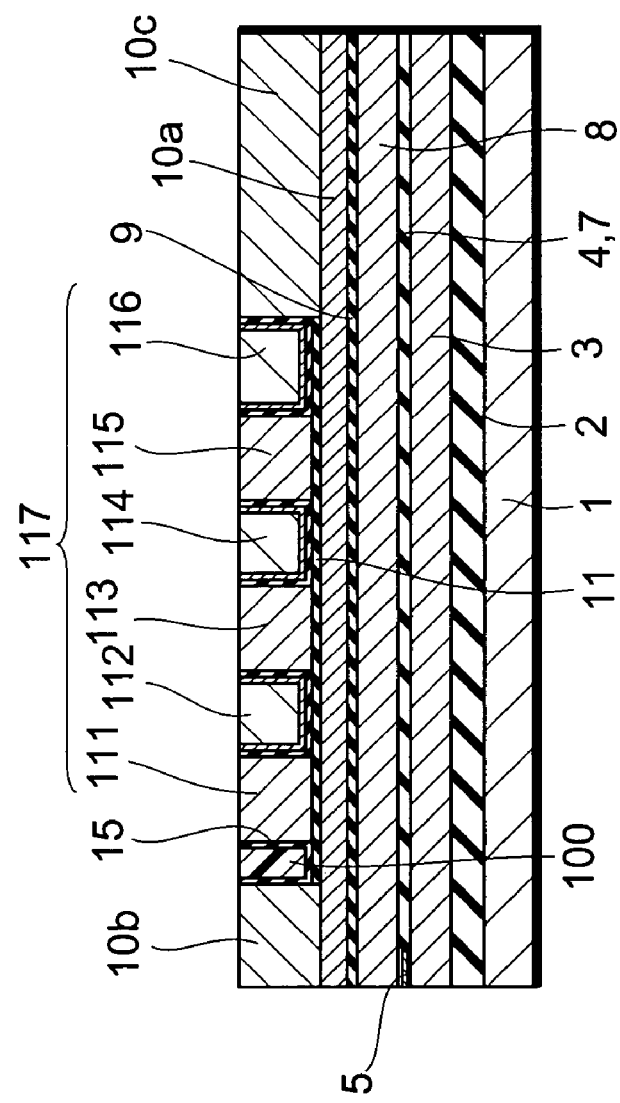

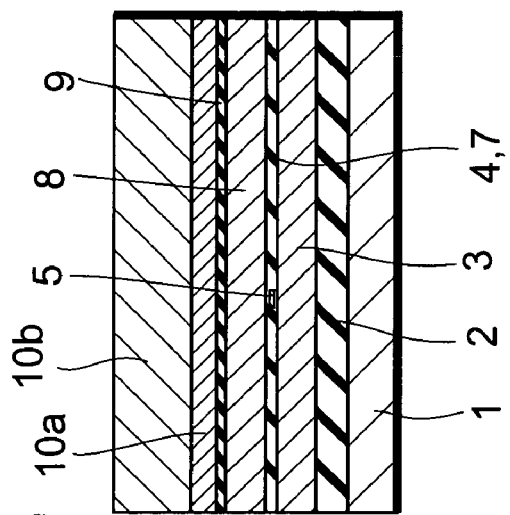
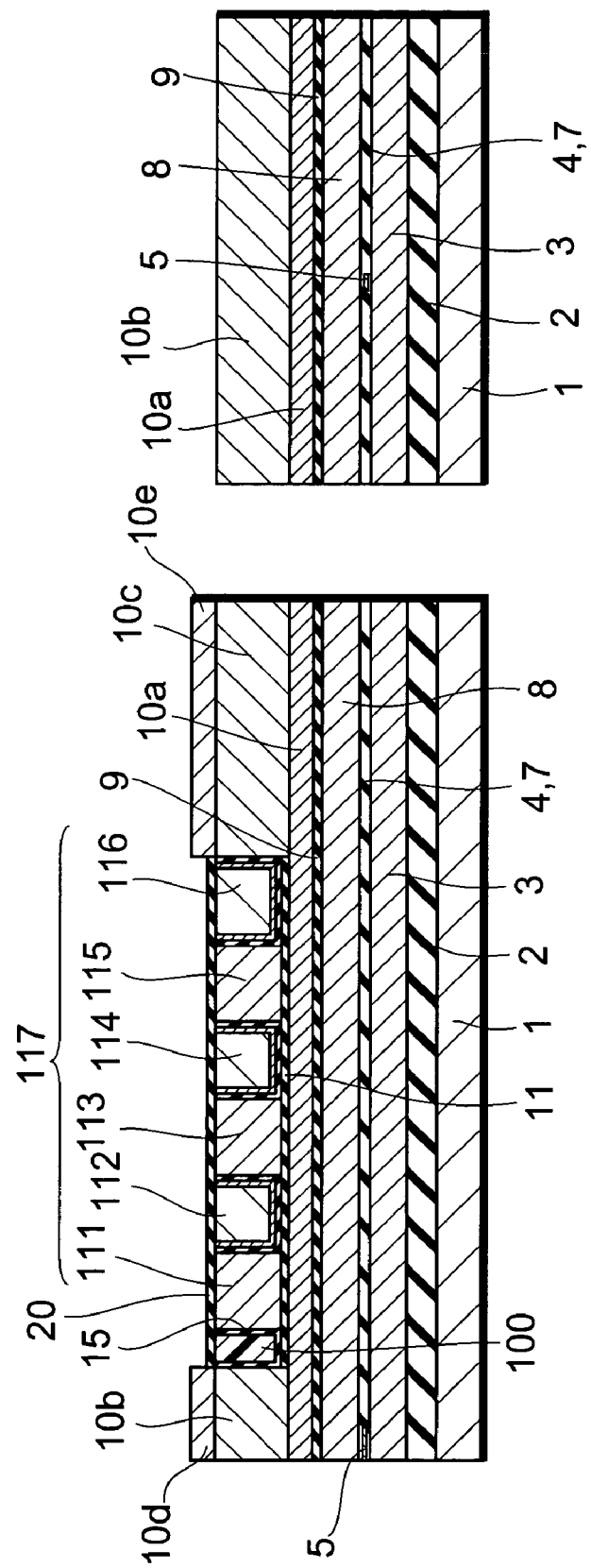

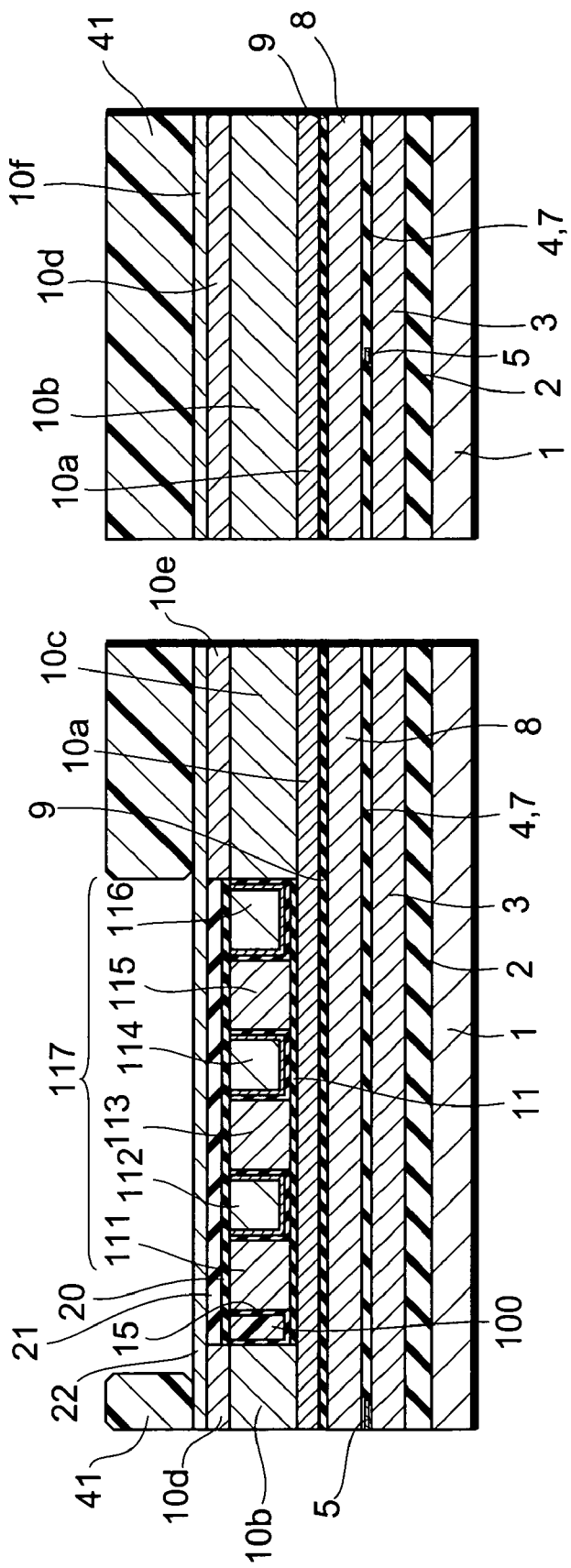

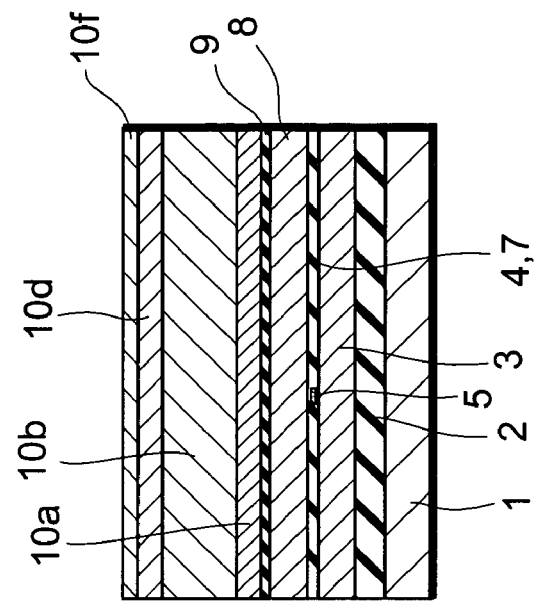
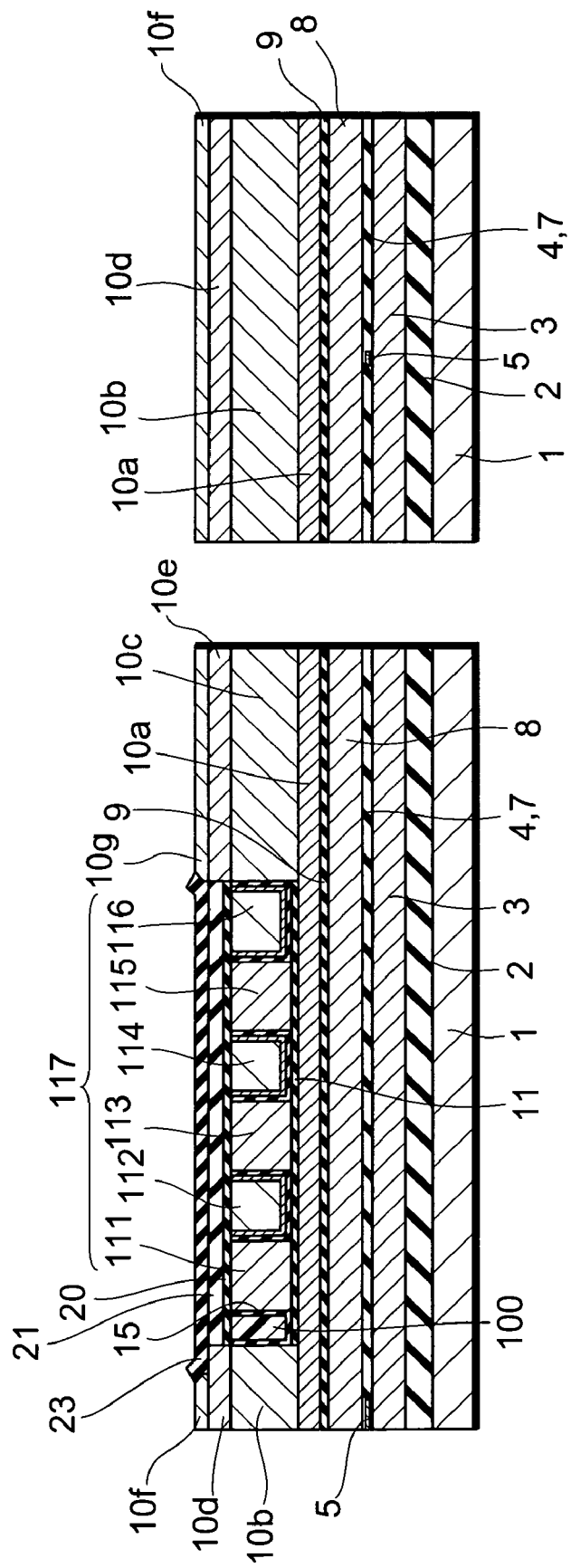

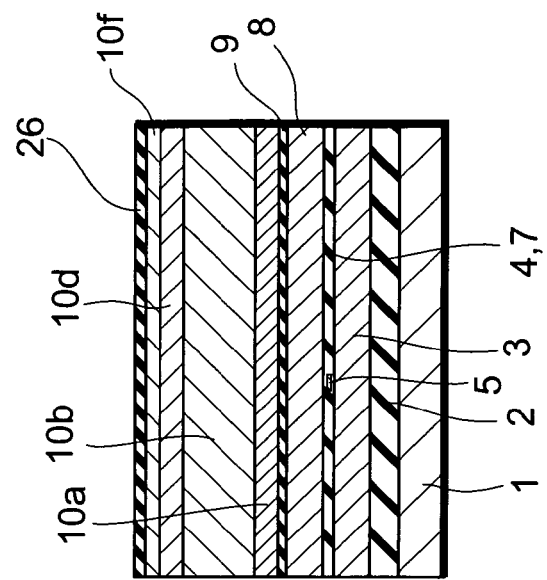
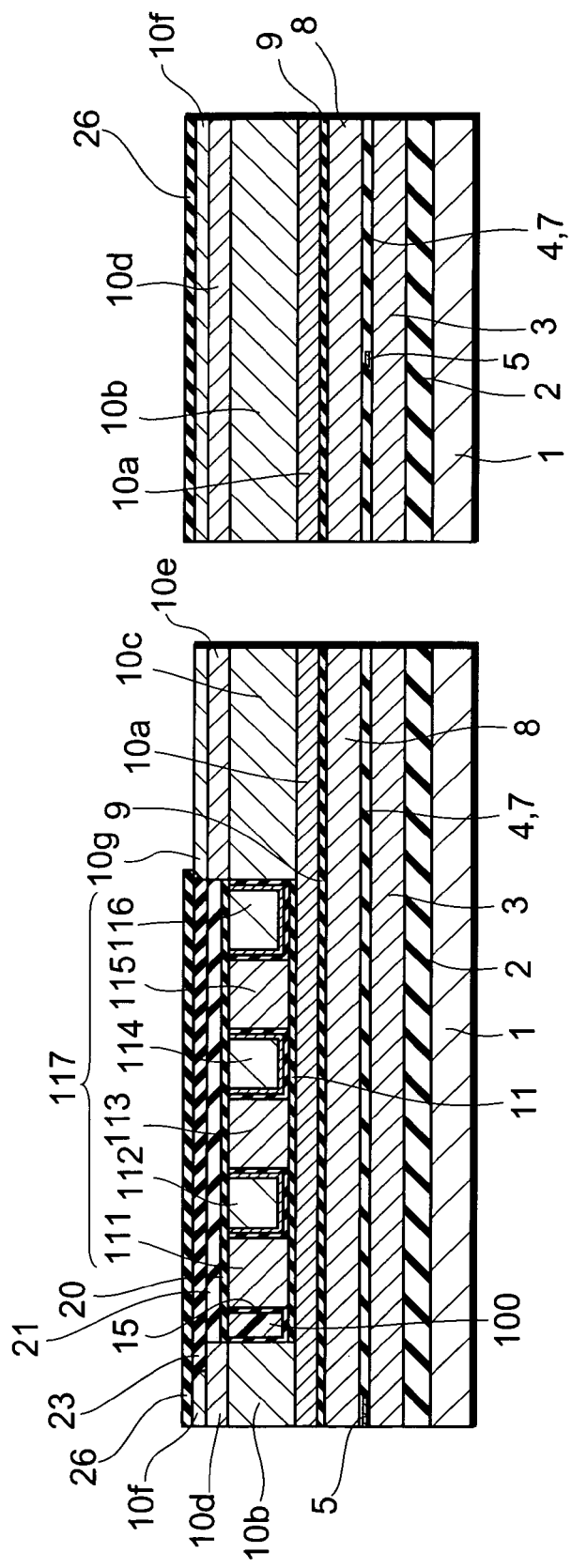
Fig.16B
Fig.16A

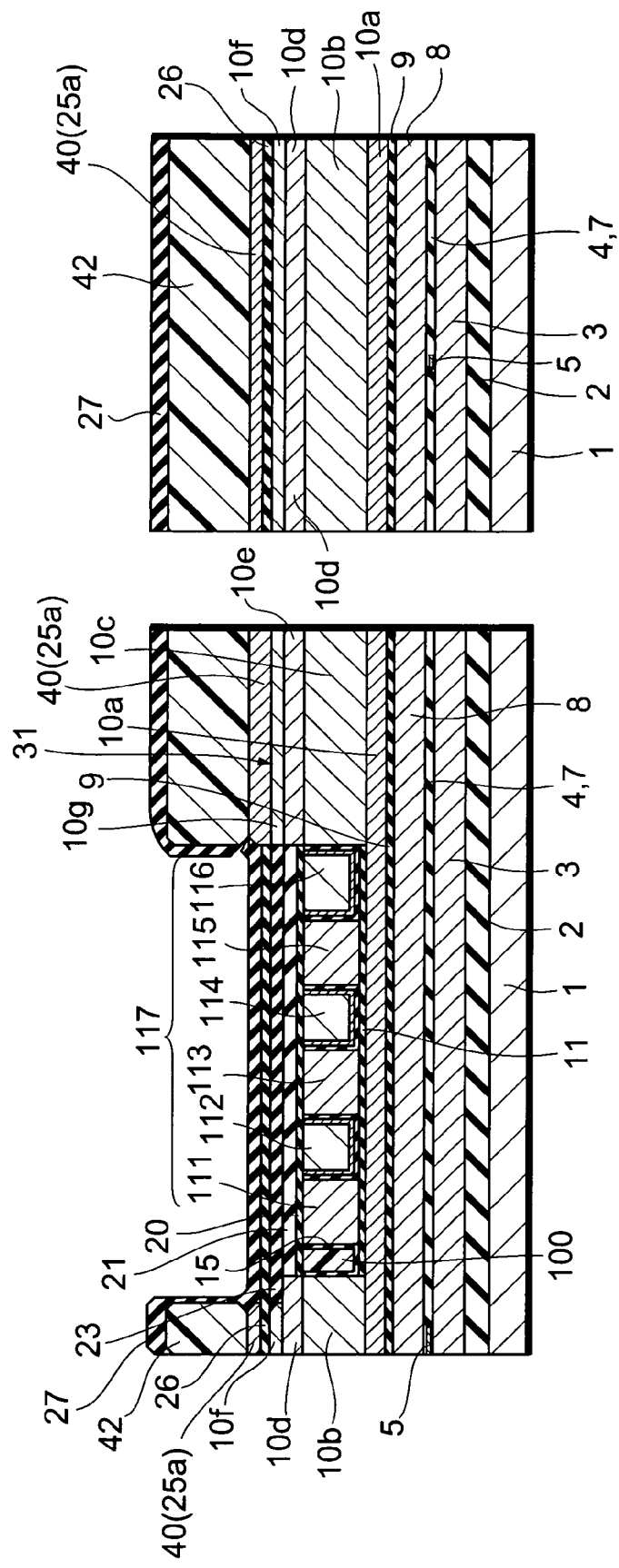

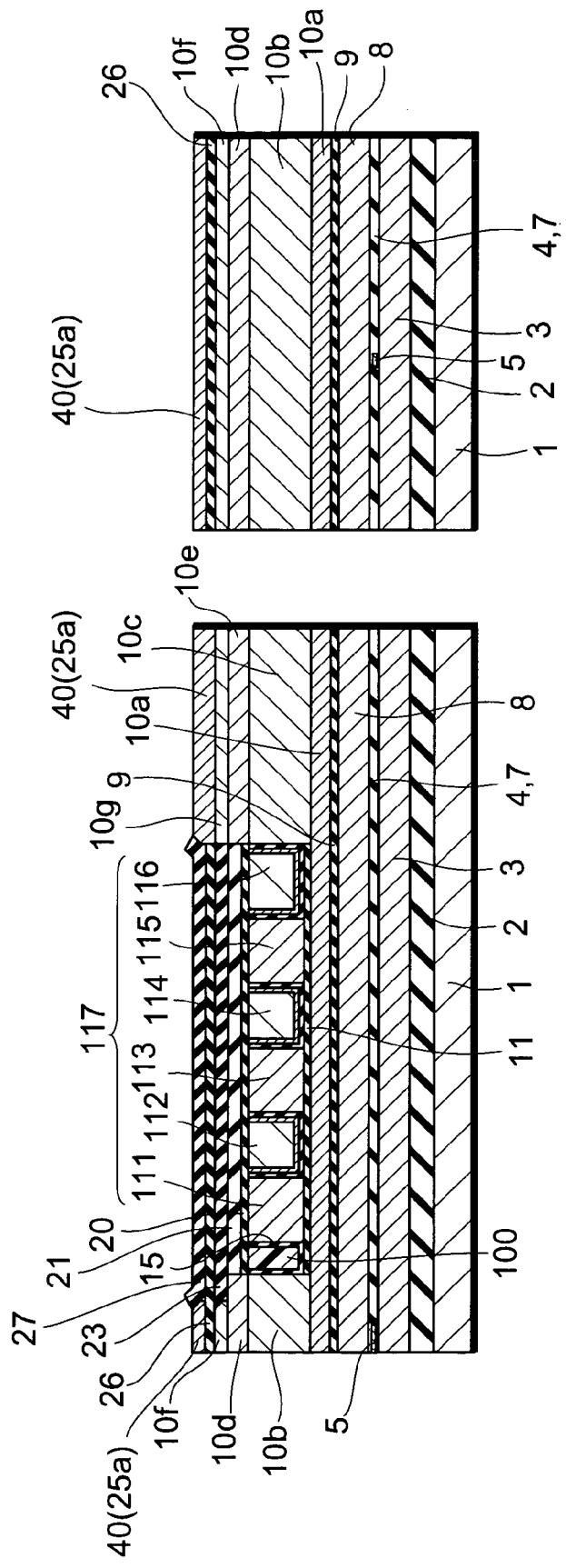

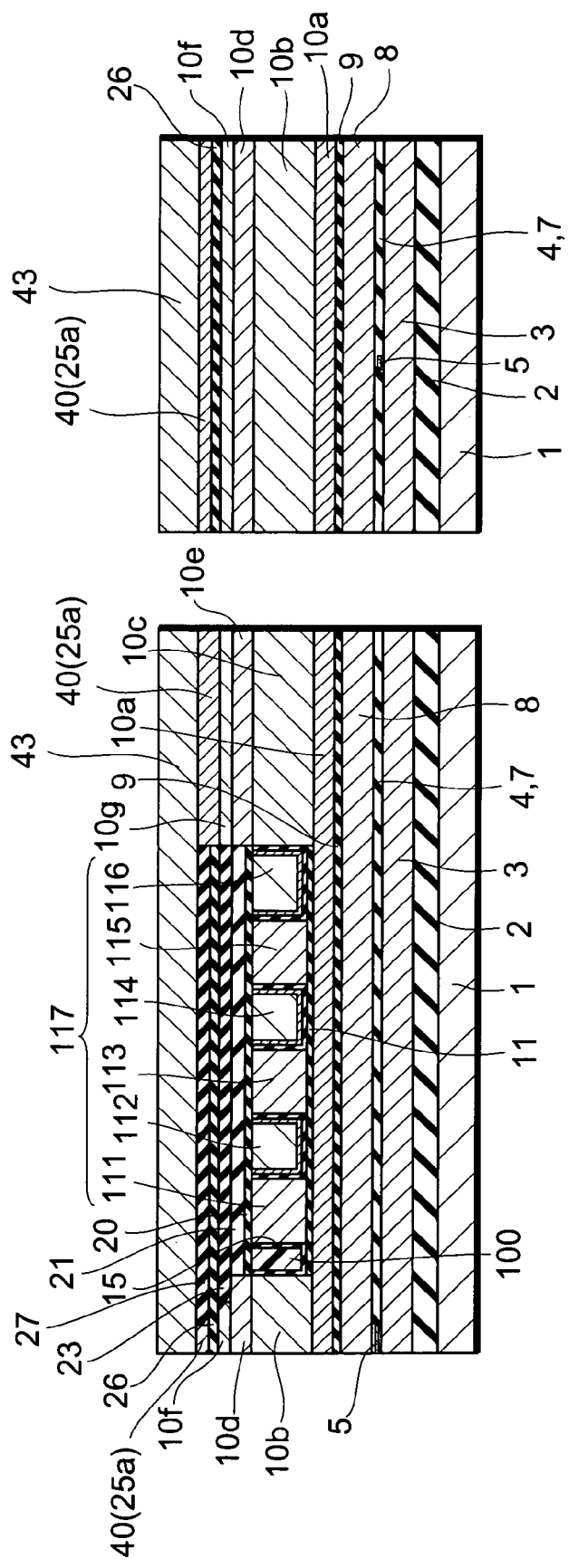

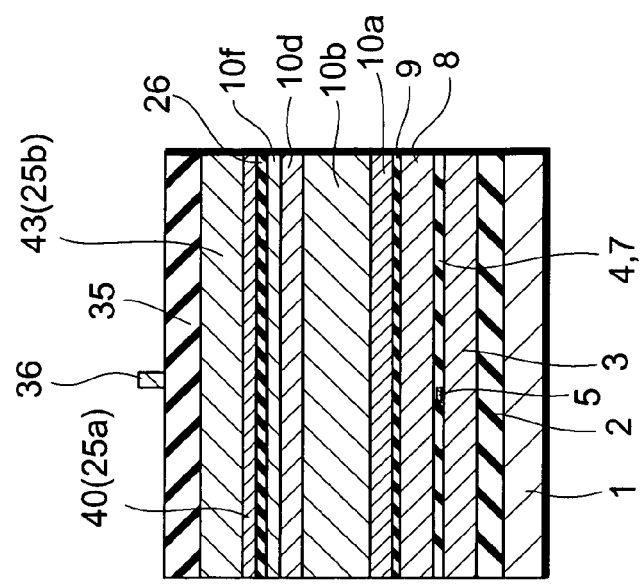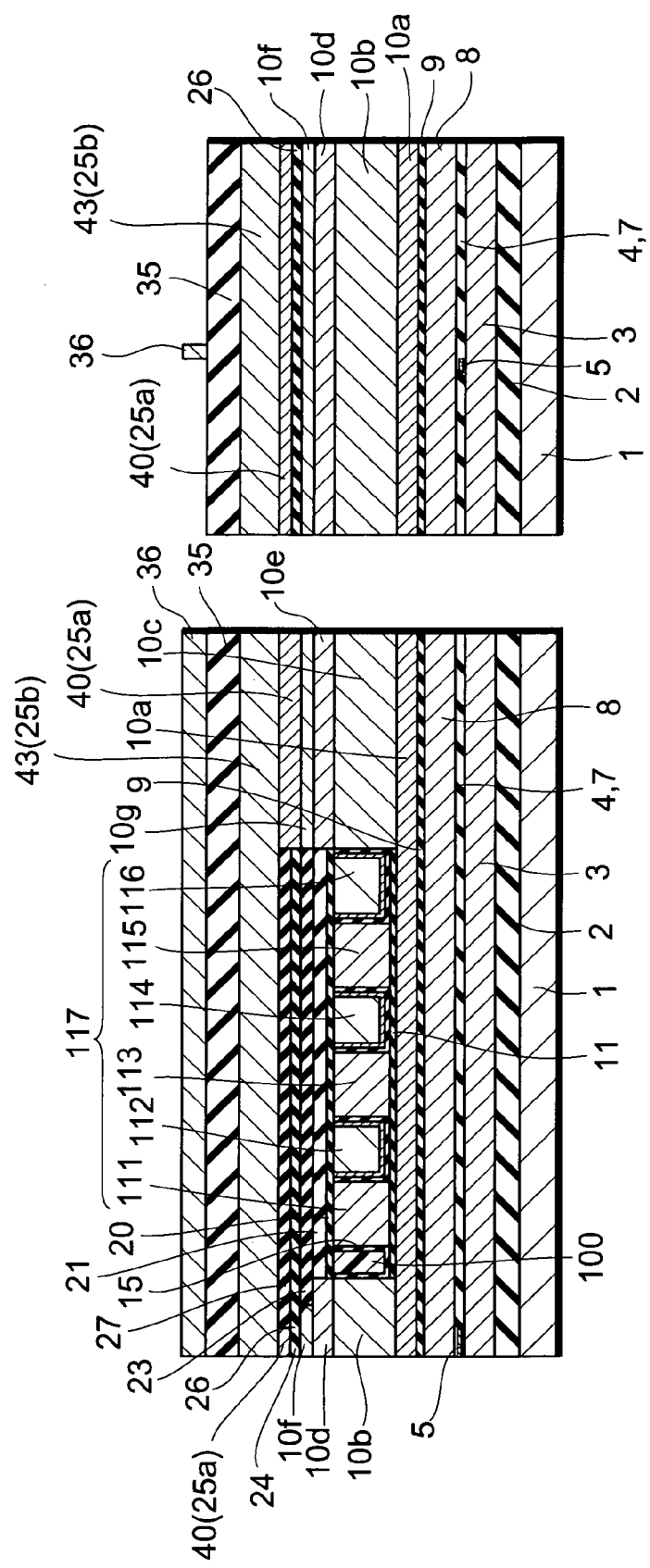

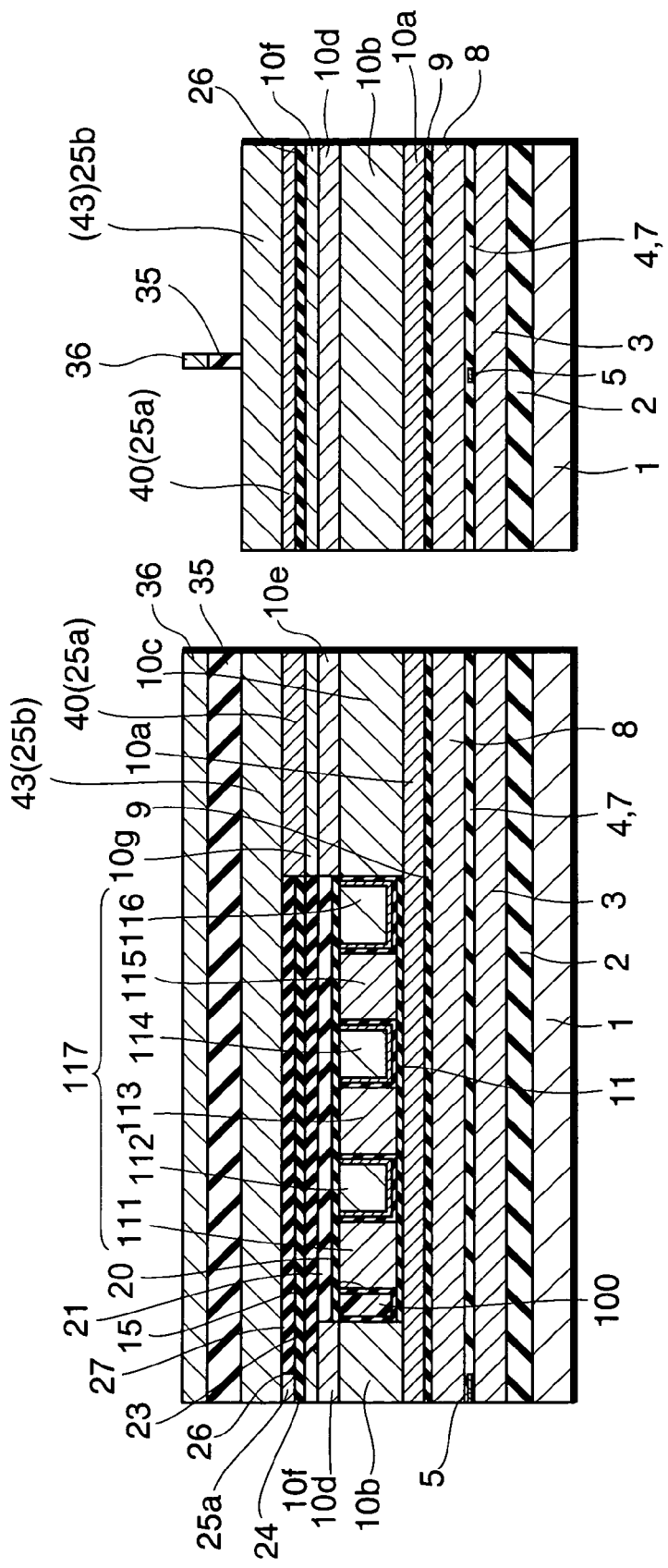

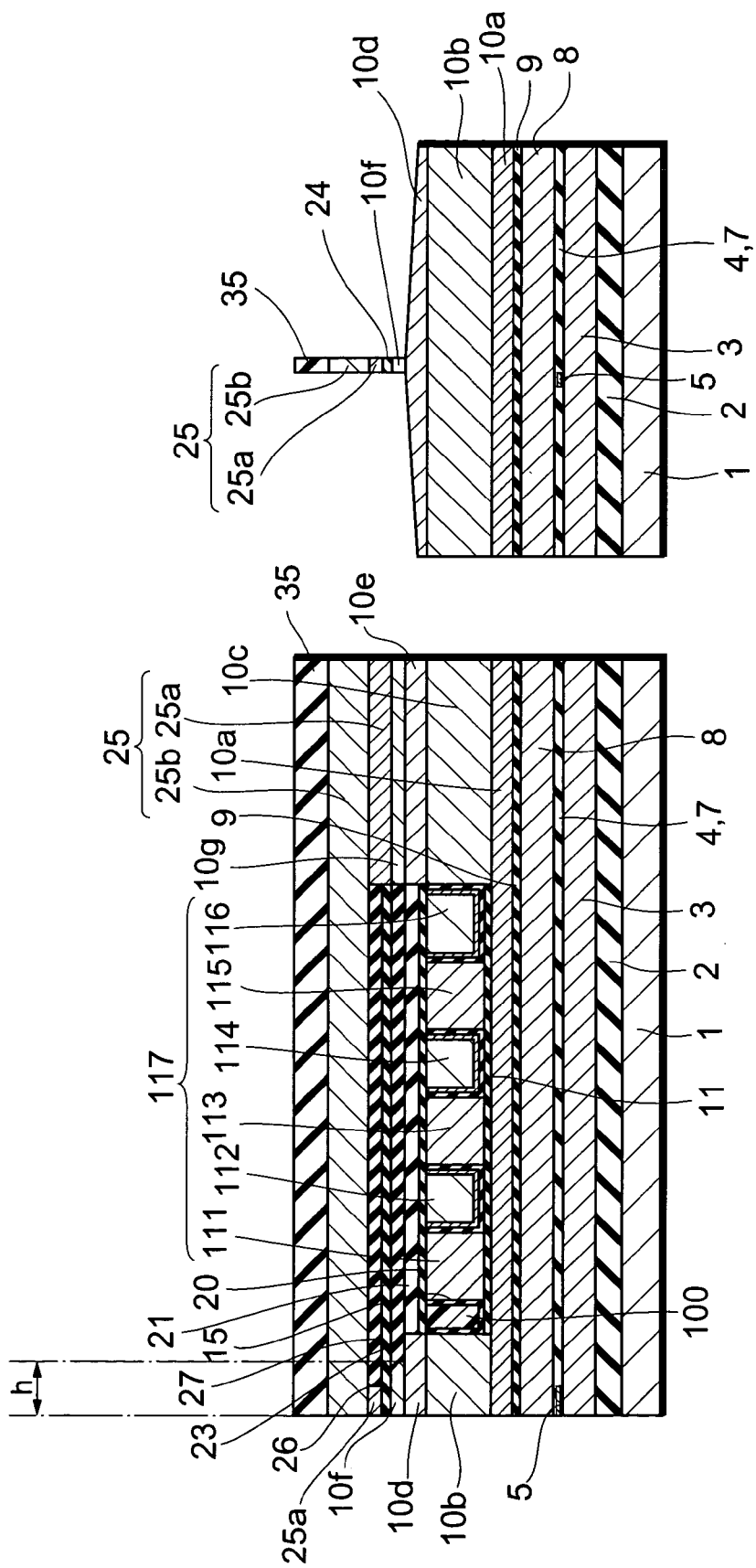

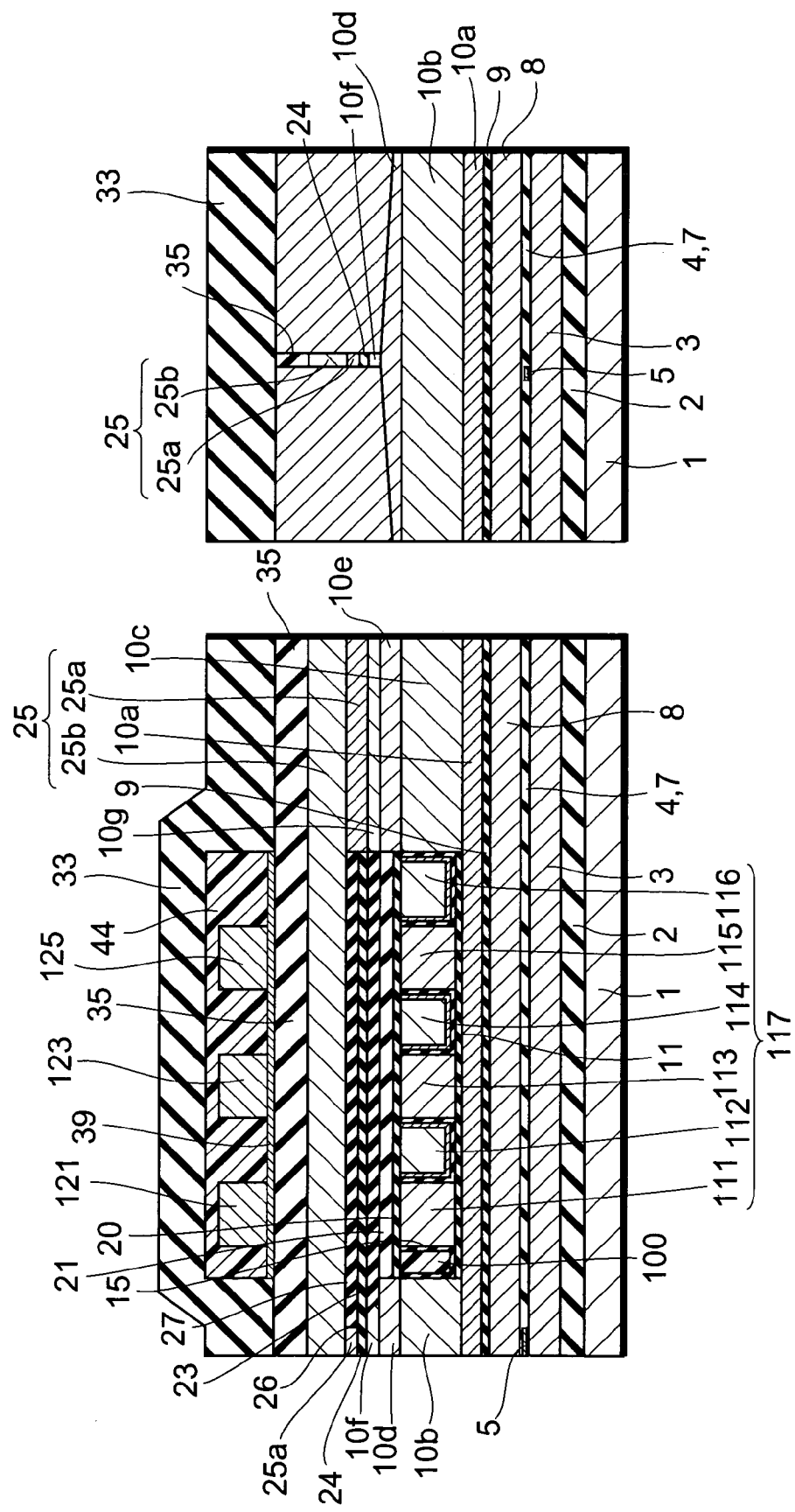

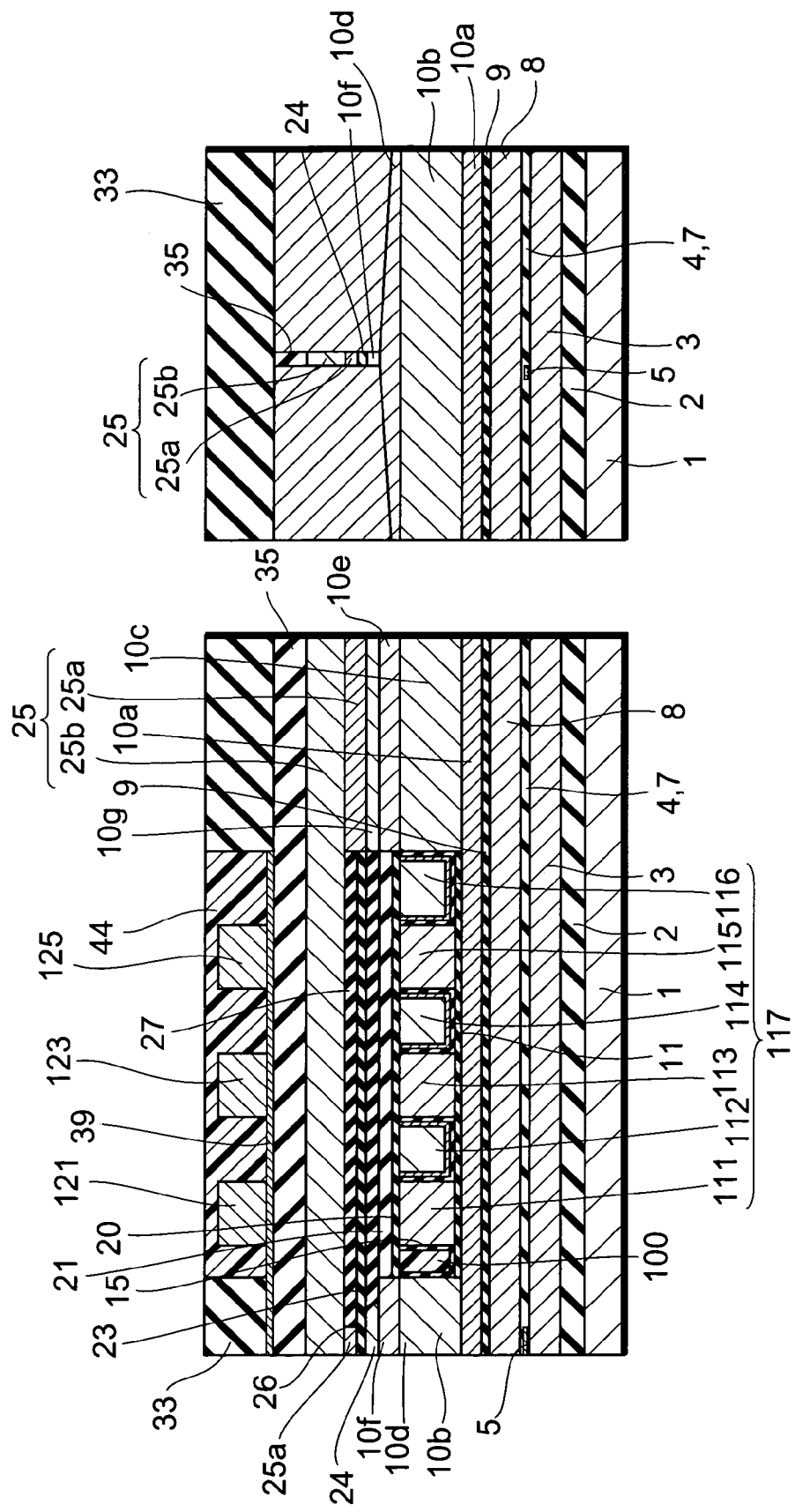

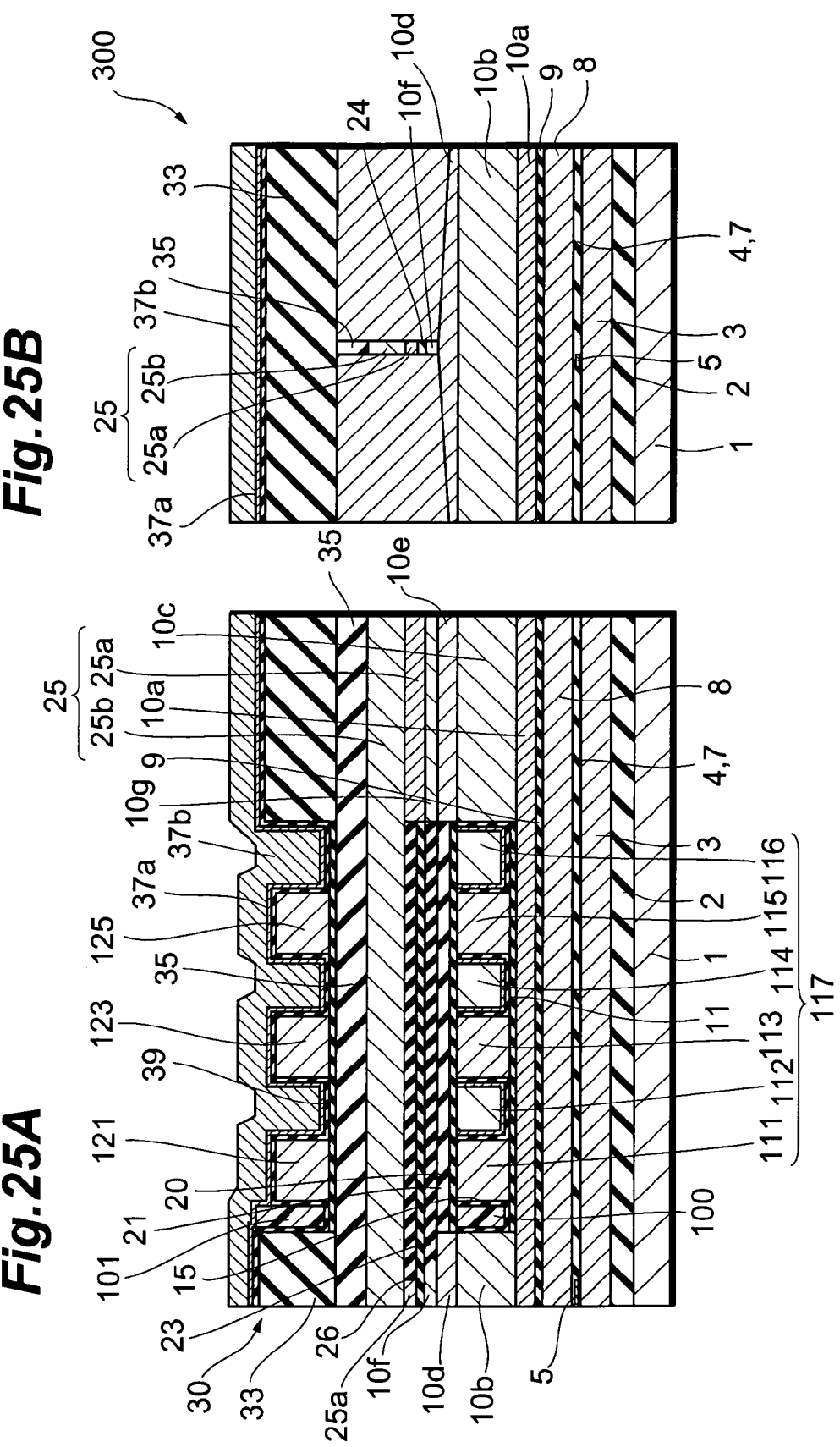

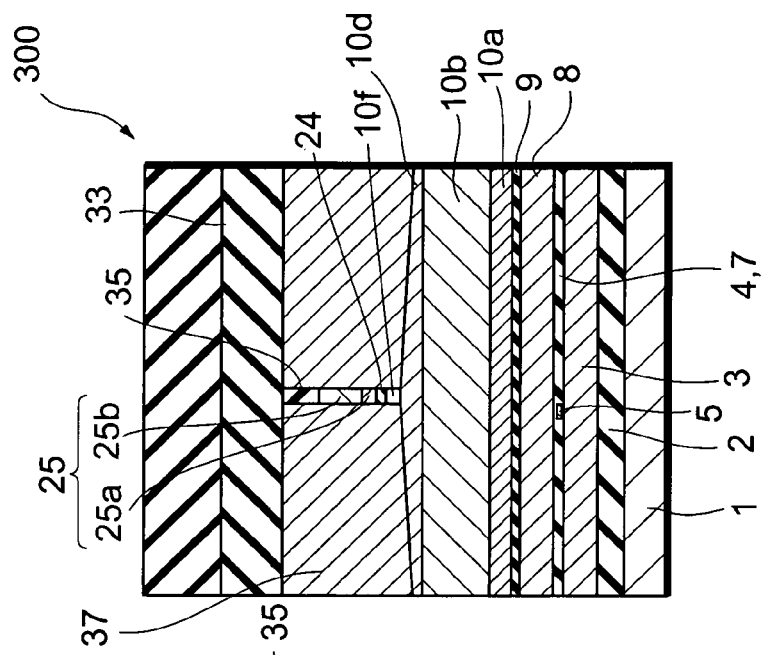
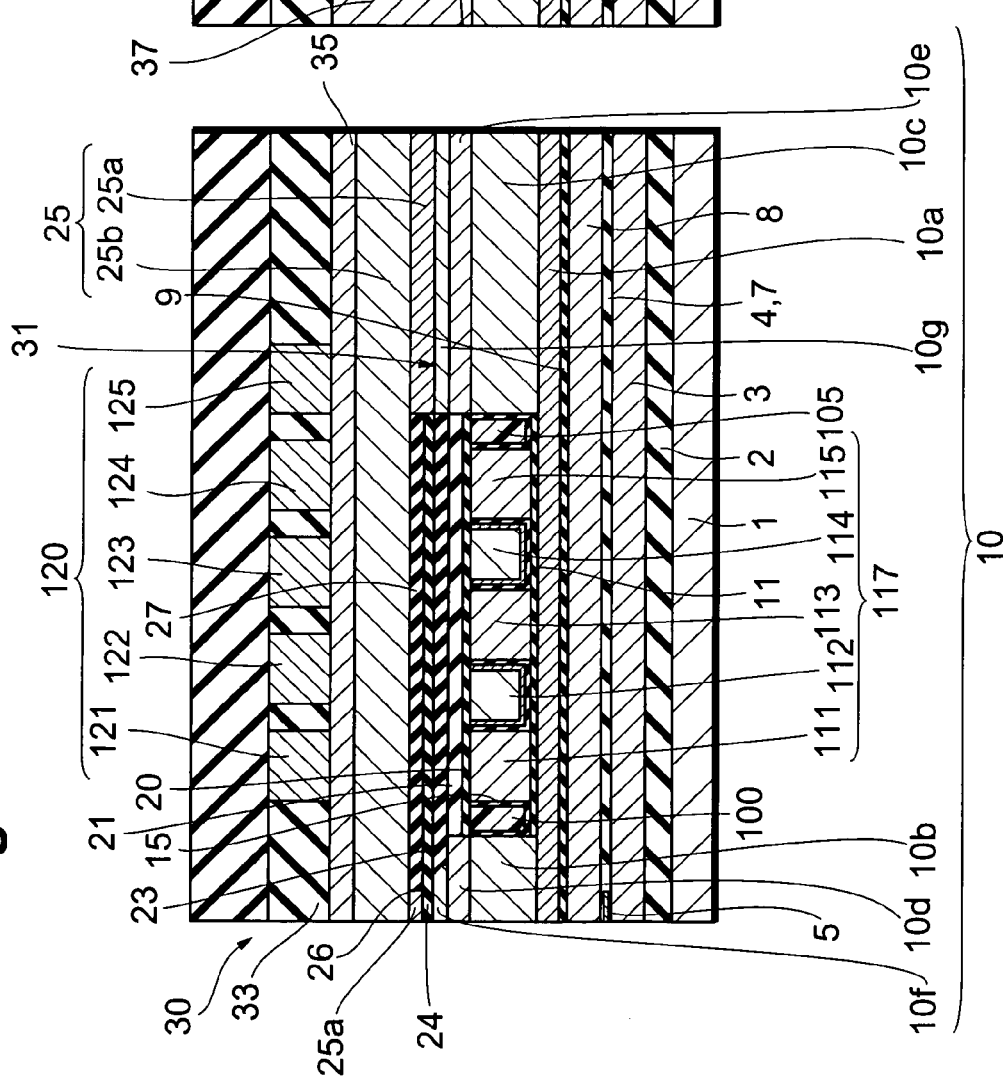

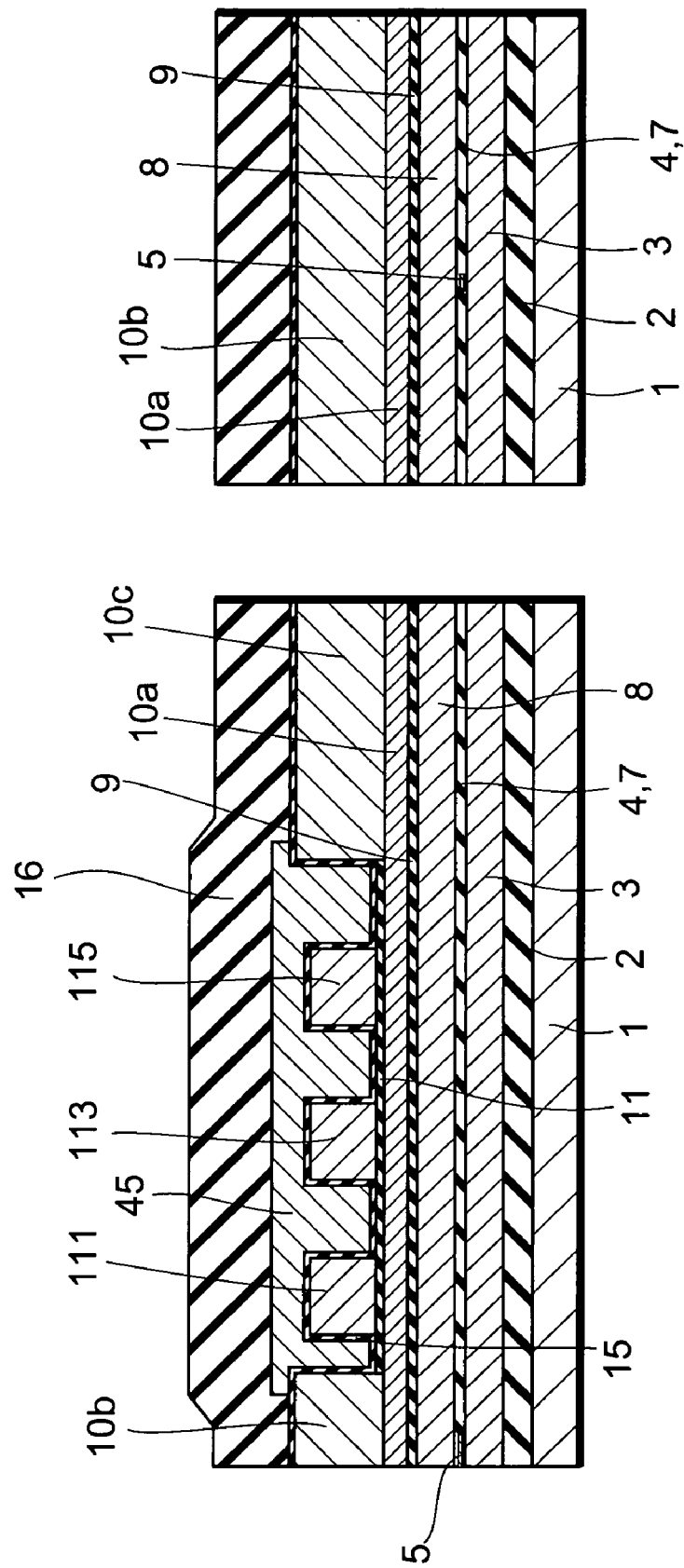

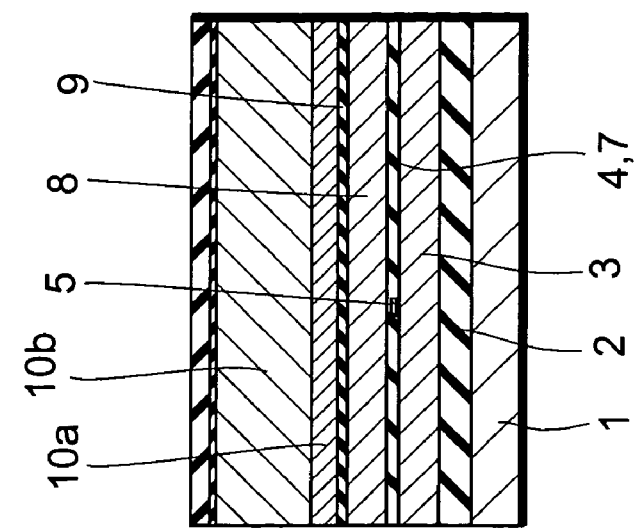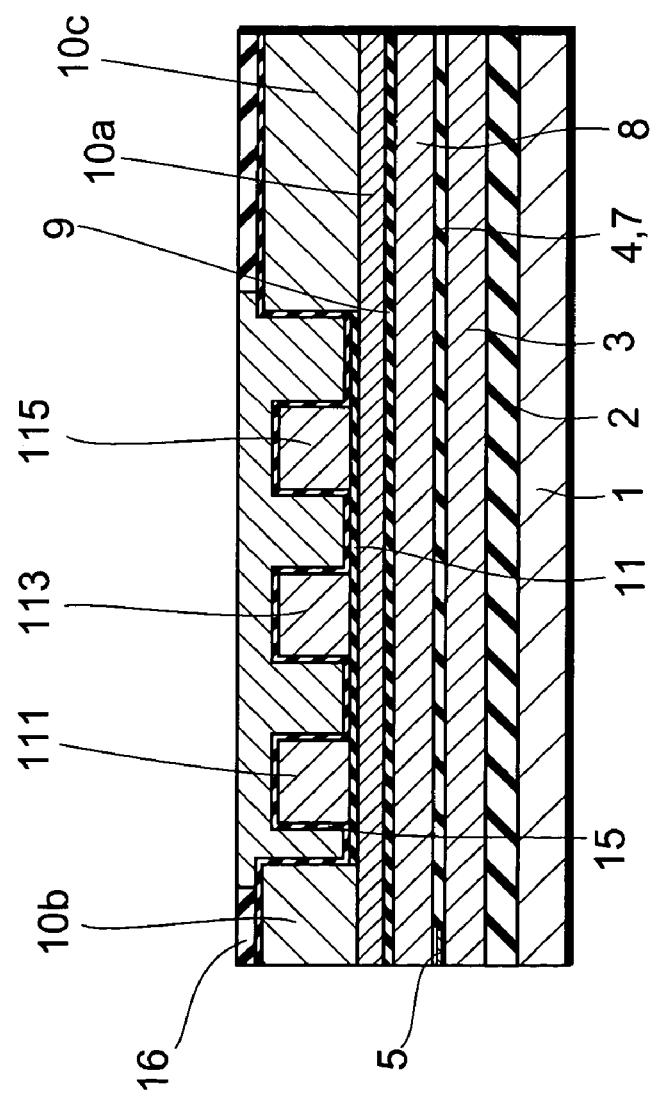

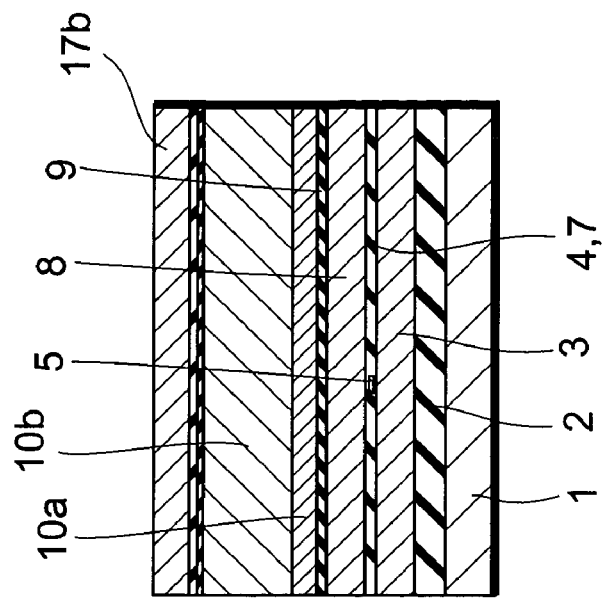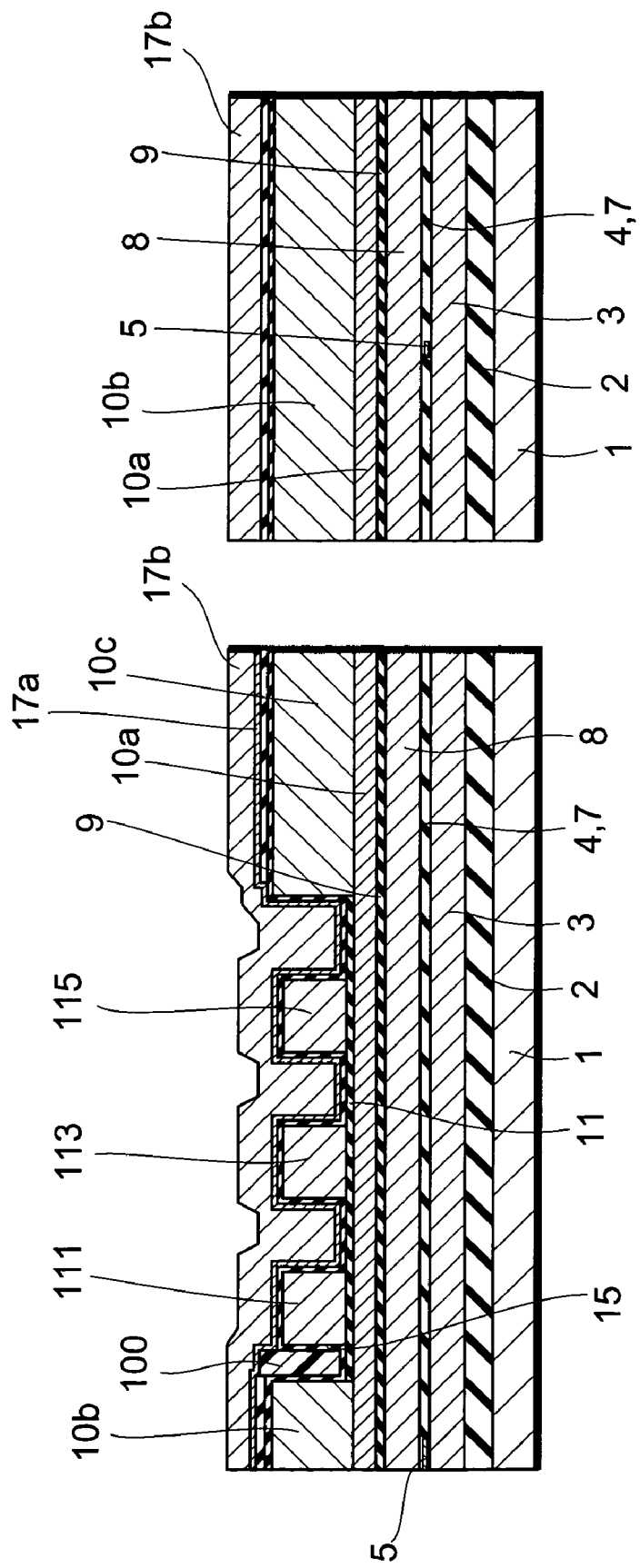

THIN-FILM MAGNETIC HEAD, METHOD OF MANUFACTURING THE SAME, HEAD GIMBAL ASSEMBLY, AND HARD DISK DRIVE

BACKGROUND OF THE INVENTION

1. Field of the Invention

The present invention relates to a thin-film magnetic head comprising at least an inductive electromagnetic transducer, a method of manufacturing the same, a head gimbal assembly, and a hard disk drive.

2. Related Background Art

In recent years, the areal density of hard disk drives has been improving remarkably. Most recently, the areal density of hard disk drives has reached 160 to 200 Gbytes/platter in particular and is about to exceed this level. As a consequence, thin-film magnetic heads are required to improve their performances.

Widely used as a thin-film magnetic head is a combination thin-film magnetic head having a structure in which a recording head comprising an inductive electromagnetic transducer for writing and a reproducing head comprising a magnetoresistive device (hereinafter also referred to as MR device) for reading are laminated.

In this kind of combination thin-film magnetic head, the recording head comprises a medium-opposing surface (also referred to as air bearing surface or ABS) opposing a recording medium, a lower magnetic pole layer, an upper magnetic pole layer, a recording gap layer, and a thin-film coil, in general. The lower and upper magnetic pole layers have respective magnetic pole parts (opposing magnetic pole parts) opposing each other on the side of medium-opposing surface, and are magnetically connected to each other by a junction disposed at a position separated from the opposing magnetic pole parts. The recording gap layer is formed between the opposing magnetic pole parts. The thin-film coil is insulated from the lower and upper magnetic pole layers and is at least partly disposed therebetween.

For improving performances of the recording head, such as its recording density in particular, its recording medium is required to improve track density. To this aim, a recording head having a narrow track structure in which the track width, i.e., the width between the two opposing magnetic pole parts on the medium-opposing surface, is reduced so as to range from several microns to submicrons, must be realized, whereby the recording head is manufactured by using a semiconductor processing technologies.

As the track width is made smaller, it becomes harder to generate a magnetic flux with a high density between the two opposing magnetic pole parts, whereby a magnetic material having a high saturated magnetic flux density is desired to be used as a material for the magnetic pole parts.

On the other hand, as the frequency of recording signals becomes higher along with the improvement in recording density, the recording head is required to improve the rate at which the magnetic flux changes, i.e., shorten the flux rise time. It is also necessary for the recording head to reduce the deterioration in recording characteristics such as overwrite characteristic and non-linear transition shift in high frequency bands.

For improving the recording characteristics in high frequency bands, it is desirable that the magnetic path length of the recording head be reduced, so as to be able to follow rapid changes of recording signals which have a high frequency and are likely to change fast. The magnetic path length is mainly determined by the length (hereinafter referred to as "yoke length") from the medium-opposing surface to the junction in the lower or upper magnetic pole layer, whereby reducing the yoke length is effective in shortening the magnetic path length. When a thin-film coil is wound between the medium-opposing surface and the junction, shortening the pitch in the part of windings of thin-film coil disposed between the medium-opposing surface and the junction (hereinafter referred to as "winding pitch") is effective in reducing the yoke length.

Conventional thin-film magnetic heads have roughly been categorized into those comprising a flat spiral thin-film coil wound about a junction (see the following Patent Document 1), and those (see the following Patent Documents 2, 3, and 4) comprising a thin-film coil helically wound about at least one of the lower and upper magnetic pole layers.

The former thin-film magnetic heads generate most of magnetic fluxes in the vicinity of the junction, and record information with the part of magnetic fluxes guided to the opposing magnetic pole parts by the lower and upper magnetic pole layers. Since most of magnetic fluxes are generated about the junction in the former thin-film magnetic heads, however, only about a few percent of the generated magnetic fluxes is used for recording, so that the recording with magnetic fluxes is not carried out efficiently. Therefore, in order to increase the magnetic fluxes used for recording, the former thin-film magnetic heads have increased the number of turns of the thin-film coil as much as possible. Conventionally known as an example of techniques therefor is one reducing the winding pitch by providing the windings of a second coil between the windings of a first coil (see the following Patent Document 5).

In the latter thin-film magnetic heads, since the thin-film coil is disposed near the medium-opposing surface, generated magnetic fluxes are used for recording more efficiently than in the former thin-film magnetic heads. Therefore, the latter thin-film magnetic heads can make the number of turns of the thin-film coil smaller than that in the former thin-film magnetic heads having a flat spiral thin-film coil, and thus is useful for shortening the yoke length.

In each of the former and latter thin-film magnetic heads, shortening the yoke length is effective in improving recording characteristics in the high frequency band, and making the winding pitch of the thin-film coil as small as possible is effective for realizing this. Increasing the number of turns of the thin-film coil is also effective for increasing magnetic fluxes used for recording. For realizing all of them, it is necessary for making the winding pitch as small as possible, so as to shorten the yoke length, thereby allowing the thin-film coil to increase its number of turns. To this aim, the thin-film coil is required to narrow the width of each turn (turn width).

However, narrowing the turn width in the thin-film coil raises the ohmic value of the thin-film coil, thereby increasing the heat generated from the thin-film coil. When the heat generated from the thin-film coil increases, the thin-film coil expands itself because of the heat. As a consequence, the magnetic pole parts project toward the recording medium, and are likely to collide with the recording medium. Therefore, conventional thin-film magnetic heads have been unable to make the turn width so small. Hence, they have failed to shorten the yoke length.

Conventionally, thin-film coils have been formed by frame plating. A frame used in frame plating includes a wall part disposed between each pair of turns. The wall part must have a certain extent of width in order to keep its shape, which makes it difficult to reduce the interval between adjacent turns (turn interval) when forming a thin-film coil by frame plating.

Patent Document 1: U.S. Pat. No. 6,043,959
Patent Document 2: U.S. Pat. No. 5,995,342
Patent Document 3: Japanese Patent Application Laid-Open No. 2000-311311
Patent Document 4: U.S. Pat. No. 6,459,543B1
Patent Document 5: U.S. Pat. No. 6,191,916B1

SUMMARY OF THE INVENTION

For solving the problems mentioned above, it is an object of the present invention to provide a thin-film magnetic head comprising a structure yielding excellent recording characteristics in high frequency bands without raising the ohmic value, a method of manufacturing the same, a head gimbal assembly, and a hard disk drive.

For solving the above-mentioned problems, the present invention provides a thin-film magnetic head comprising a configuration in which first and second magnetic pole groups, magnetically connected to each other, having respective magnetic pole parts opposing each other on a side of a medium-opposing surface opposing a recording medium; a recording gap layer formed between the magnetic pole parts; and a thin-film coil insulated from the first and second magnetic pole groups and wound helically about at least one of the first and second magnetic pole groups or flatly spirally wound about a junction connecting the first and second magnetic pole groups to each other are laminated on a substrate; wherein the thin-film coil comprises a first conductor group having a plurality of inner conductor parts disposed between the first and second magnetic pole groups, a second conductor group having a plurality of outer conductor parts disposed outside the second magnetic pole group or junction, and a connecting part group having respective connecting parts for connecting the inner conductor parts to the outer conductor parts; wherein the first conductor group has an insulating contact structure in which the inner conductor parts are in contact with each other by way of an insulating film; and wherein an inner relaxing part comprising a material softer than at least one of the first, second conductor groups and first, second magnetic pole groups and being in contact with the first conductor group by way of an insulating film is provided.

In this thin-film magnetic head, since the first conductor group has an insulating contact structure, only an insulating film exists between each pair of adjacent inner conductor parts, whereas the gap therebetween equals the thickness of the insulating film. Also, since the inner relaxing part is provided, the thin-film magnetic head is less susceptible to the self-expansion of the first conductor group.

The thin-film magnetic head may be configured such that the inner relaxing part is arranged between the inner conductor part disposed on the medium-opposing surface side and the first magnetic pole group.

Preferably, the inner relaxing part is further provided between the inner conductor part disposed on the junction side and the first magnetic pole group. Since the inner relaxing part is arranged on the side nearer to the medium-opposing surface, such a configuration can make the thin-film magnetic head less susceptible to the self-expansion of the first conductor group.

The second conductor group may have an insulating contact structure in which the outer conductor parts are in contact with each other by way of an insulating film, and an outer relaxing part comprising a material softer than at least one of the first, second conductor groups and the first, second magnetic pole groups and being in contact with the second conductor group by way of an insulating film may be provided.

In this case, not only the inner conductor parts but also the outer conductor parts include only an insulating film between each pair of adjacent ones, whereas the gap therebetween equals the thickness of the insulating film. Also, the outer relaxing part makes the thin-film magnetic head less susceptible to the self-expansion of the second conductor group.

Preferably, in this case, the outer relaxing part is arranged between the outer conductor part disposed on the medium-opposing surface side and the medium-opposing surface.

In this case, since the outer relaxing part is disposed on the side nearer to the medium-opposing surface, the thin-film magnetic head can be less susceptible to the self-expansion of the second conductor group.

Preferably, in the first and second conductor groups, respective densities of arrangements of inner and outer conductor parts in a direction intersecting the medium-opposing surface increase from the outside of the second magnetic pole group to the second magnetic pole group.

In this case, the thin-film magnetic head is configured such that each set of the inner and outer conductor parts becomes denser and reduces the winding pitch as the second magnetic pole group is nearer.

Preferably, the inner and outer conductor parts have a variable width structure in which a path width gradually increases from a part corresponding to the second magnetic pole group to the outside thereof.

This makes the inner and outer conductor parts less likely to obstruct current flows, whereby the current flows smoothly.

Preferably, in this thin-film magnetic head, the first magnetic pole group has a protrusion projecting toward the medium-opposing surface.

This can change respective path widths of the inner and outer conductor parts along the first magnetic pole group.

Preferably, each of the inner and outer conductor parts has a narrowest part with the narrowest path width at a location corresponding to the protrusion.

This minimizes an area in which the path width is narrowed in each of the inner and outer conductor parts.

Preferably, the protrusion has a curved surface projecting toward the medium-opposing surface.

This can change the form of a side part of each of the inner and outer conductor parts along the protrusion.

Preferably, each of the inner and outer conductor parts is curved in conformity to a side face form of the protrusion.

This can smoothly change the path width of each of the inner and outer conductor parts.

The present invention provides a method of manufacturing a thin-film magnetic head by laminating first and second magnetic pole groups, magnetically connected to each other, having respective magnetic pole parts opposing each other on a side of a medium-opposing surface opposing a recording medium; a recording gap layer formed between the magnetic pole parts; and a thin-film coil insulated from the first and second magnetic pole groups and wound helically about at least one of the first and second magnetic pole groups on a substrate, the method comprising the following steps (1) to (10):

(1) forming a plurality of inner conductor parts and a lower connecting layer in contact by way of an insulating film on a first magnetic pole layer disposed on the substrate and a second magnetic pole layer disposed at a location for determining a yoke length with a relaxing part gap adjoining the first inner conductor parts;

(2) forming inner grooves covered with a separation insulating film between the second magnetic pole layer and adjacent first inner conductor parts and at the relaxing part gap;

(3) forming each inner groove with an inner relaxing part made of a material softer than at least one of the first inner conductor part and second magnetic pole layers and a second inner conductor part, and forming a first conductor group by the first and second inner conductor parts;

(4) forming a first magnetic pole group by laminating a third magnetic pole layer on the second magnetic pole layer;

(5) forming a second magnetic pole group on the first magnetic pole group so as to provide the recording gap layer;

(6) forming a connecting part group by disposing an upper connecting layer on the lower connecting layer;

(7) forming a plurality of first outer conductor parts in contact with the second magnetic pole group by way of an insulating film, and an insulating part disposed at the position for determining the yoke length;

(8) forming outer grooves covered with a separation insulating film between the insulating part and the first outer conductor parts adjacent each other;

(9) forming each outer groove with a second outer conductor part, and forming a second conductor group by the first and second outer conductor parts; and

(10) forming the thin-film coil by the first and second outer conductor groups and the connecting part group.

These steps can yield a thin-film magnetic head, in which the first conductor group has an insulating contact structure, further comprising an inner relaxing part in contact with the first conductor group by way of an insulating film.

Further, the present invention provides a method of manufacturing a thin-film magnetic head by laminating first and second magnetic pole groups, magnetically connected to each other, having respective magnetic pole parts opposing each other on a side of a medium-opposing surface opposing a recording medium; a recording gap layer formed between the magnetic pole parts; and a thin-film coil insulated from the first and second magnetic pole groups and wound helically about at least one of the first and second magnetic pole groups on a substrate, the method comprising the following steps (1) to (10):

(1) forming a plurality of inner conductor parts and a lower connecting layer in contact by way of an insulating film on a first magnetic pole layer disposed on the substrate and a second magnetic pole layer disposed at a location for determining a yoke length with a inner relaxing part gap adjoining the first inner conductor parts;

(2) forming inner grooves covered with a separation insulating film between the second magnetic pole layer and adjacent first inner conductor parts and at the inner relaxing part gap;

(3) forming each inner groove with an inner relaxing part made of a material softer than at least one of the first inner conductor part and second magnetic pole layers and a second inner conductor part, and forming a first conductor group by the first and second inner conductor parts;

(4) forming a first magnetic pole group by laminating a third magnetic pole layer on the second magnetic pole layer;

(5) forming a second magnetic pole group on the first magnetic pole group so as to provide the recording gap layer;

(6) forming a connecting part group by disposing an upper connecting layer on the lower connecting layer;

(7) forming a plurality of first outer conductor parts in contact with the second magnetic pole group by way of an insulating film, and an insulating part disposed at the position for determining the yoke length, while providing an outer relaxing part gap adjacent the first outer conductor parts;

(8) forming outer grooves covered with a separation insulating film between the insulating part and the first outer conductor parts adjacent each other and at the outer relaxing part gap;

(9) forming each outer groove with an outer relaxing part made of a material softer than the first outer conductor parts, and a second outer conductor part, and forming a second conductor group by the first and second outer conductor parts; and

(10) forming the thin-film coil by the first and second outer conductor groups and the connecting part group.

These steps can yield a thin-film magnetic head, in which the first and second conductor groups have an insulating contact structure, further comprising inner and outer relaxing parts in contact with the first and second conductor groups by way of insulating films, respectively.

In this method, each of the first and second inner conductor parts and first and second outer conductor parts may be formed by plating.

The second inner conductor parts and second outer conductor parts may be formed by making an electrode film by sputtering and plating a conductive layer on the electrode film.

The separation insulating film may be formed by laminating a plurality of alumina films.

Furthermore, the present invention provides a head gimbal assembly comprising a thin-film magnetic head formed on a support, and a gimbal securing the support; the thin-film magnetic head comprising a configuration in which first and second magnetic pole groups, magnetically connected to each other, having respective magnetic pole parts opposing each other on a side of a medium-opposing surface opposing a recording medium; a recording gap layer formed between the magnetic pole parts; and a thin-film coil insulated from the first and second magnetic pole groups and wound helically about at least one of the first and second magnetic pole groups or flatly spirally wound about a junction connecting the first and second magnetic pole groups to each other are laminated on a substrate; wherein the thin-film coil comprises a first conductor group having a plurality of inner conductor parts disposed between the first and second magnetic pole groups, a second conductor group having a plurality of outer conductor parts disposed outside the second magnetic pole group or junction, and a connecting part group having respective connecting parts for connecting the inner conductor parts to the outer conductor parts; wherein the first conductor group has an insulating contact structure in which the inner conductor parts are in contact with each other by way of an insulating film; and wherein an inner relaxing part comprising a material softer than at least one of the first, second conductor groups and the first, second magnetic pole groups and being in contact with the first conductor group by way of an insulating film is provided.

Also, the present invention provides a hard disk drive comprising a head gimbal assembly including a thin-film magnetic head, and a recording medium opposing the thin-film magnetic head; the thin-film magnetic head comprising a configuration in which first and second magnetic pole groups, magnetically connected to each other, having respective magnetic pole parts opposing each other on a side of a medium-opposing surface opposing a recording medium; a recording gap layer formed between the magnetic pole parts; and a thin-film coil insulated from the first and second magnetic pole groups and wound helically about at least one of the first and second magnetic pole groups or flatly spirally wound about a junction connecting the first and second magnetic pole groups to each other are laminated on a substrate; wherein the thin-film coil comprises a first conductor group having a plurality of inner conductor parts disposed between the first and second magnetic pole groups, a second conductor group having a plurality of outer conductor parts disposed outside the second magnetic pole group or junction, and a connecting part group having respective connecting parts for connecting the inner conductor parts to the outer conductor parts; wherein the first conductor group has an insulating contact structure in which the inner conductor parts are in contact with each other by way of an insulating film; and wherein an inner relaxing part comprising a material softer than at least one of the first, second conductor groups and the first, second magnetic pole groups and being in contact with the first conductor group by way of an insulating film is provided.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 4A is a sectional view taken along the line IV—IV of FIG. 2, whereas FIG. 4B is a sectional view parallel to an air bearing surface;

FIGS. 5A and 5B are sectional views showing a step in the process of manufacturing the thin-film magnetic head;

FIGS. 6A and 6B are sectional views showing a step subsequent to that of FIGS. 5A and 5B;

FIGS. 7A and 7B are sectional views showing a step subsequent to that of FIGS. 6A and 6B;

FIGS. 8A and 8B are sectional views showing a step subsequent to that of FIGS. 7A and 7B;

FIGS. 9A and 9B are sectional views showing a step subsequent to that of FIGS. 8A and 8B;

FIGS. 10A and 10B are sectional views showing a step subsequent to that of FIGS. 9A and 9B;

FIGS. 11A and 11B are sectional views showing a step subsequent to that of FIGS. 10A and 10B;

FIGS. 12A and 12B are sectional views showing a step subsequent to that of FIGS. 11A and 11B;

FIGS. 13A and 13B are sectional views showing a step subsequent to that of FIGS. 12A and 12B;

FIGS. 15A and 15B are sectional views showing a step subsequent to that of FIGS. 14A and 14B;

FIGS. 16A and 16B are sectional views showing a step subsequent to that of FIGS. 15A and 15B;

FIGS. 17A and 17B are sectional views showing a step subsequent to that of FIGS. 16A and 16B;

FIGS. 18A and 18B are sectional views showing a step subsequent to that of FIGS. 17A and 17B;

FIGS. 19A and 19B are sectional views showing a step subsequent to that of FIGS. 18A and 18B;

FIGS. 20A and 20B are sectional views showing a step subsequent to that of FIGS. 19A and 19B;

FIGS. 21A and 21B are sectional views showing a step subsequent to that of FIGS. 20A and 20B;

FIGS. 22A and 22B are sectional views showing a step subsequent to that of FIGS. 21A and 21B;

FIGS. 23A and 23B are sectional views showing a step subsequent to that of FIGS. 22A and 22B;

FIGS. 24A and 24B are sectional views showing a step subsequent to that of FIGS. 23A and 23B;

FIGS. 25A and 25B are sectional views showing a step subsequent to that of FIGS. 24A and 24B;

FIG. 28A is a sectional view showing the thin-film magnetic head in a second modified example as with FIG. 4A, whereas FIG. 28B is a sectional view thereof as with FIG. 4B;

FIGS. 29A and 29B are sectional views showing a step in another manufacturing method;

FIGS. 30A and 30B are sectional views showing a step subsequent to that of FIGS. 29A and 29B;

FIGS. 31A and 31B are sectional views showing a step subsequent to that of FIGS. 30A and 30B;

DETAILED DESCRIPTION OF THE PREFERRED EMBODIMENTS

In the following, embodiments of the present invention will be explained with reference to the drawings. Constituents identical to each other will be referred to with numerals identical to each other without repeating their overlapping explanations.

First Embodiment

Structure of Thin-Film Magnetic Head

Figure 1:
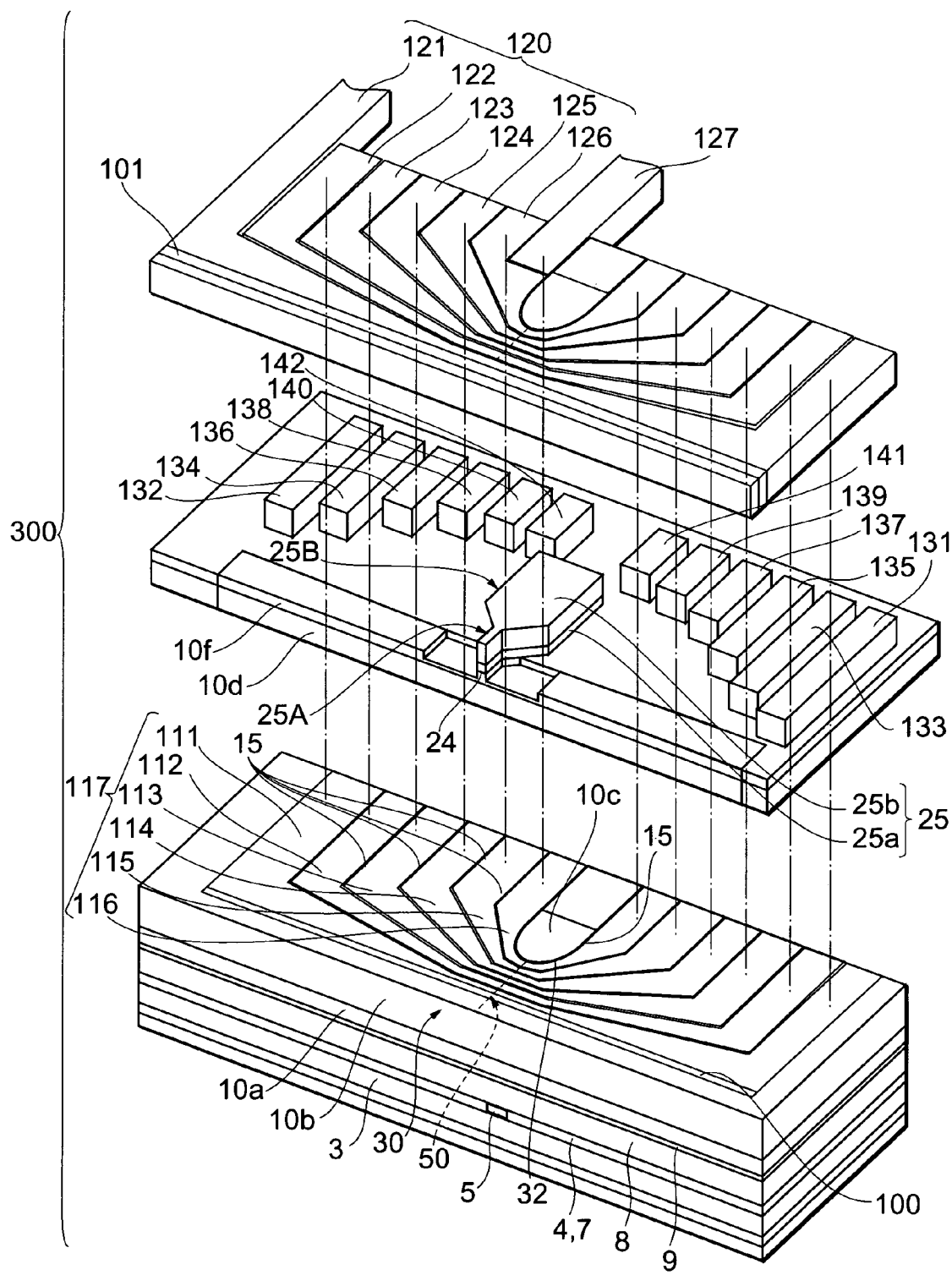
FIG. 1 is an exploded perspective view showing a main part of the thin-film magnetic head in accordance with a first embodiment of the present invention.
Figure 2:
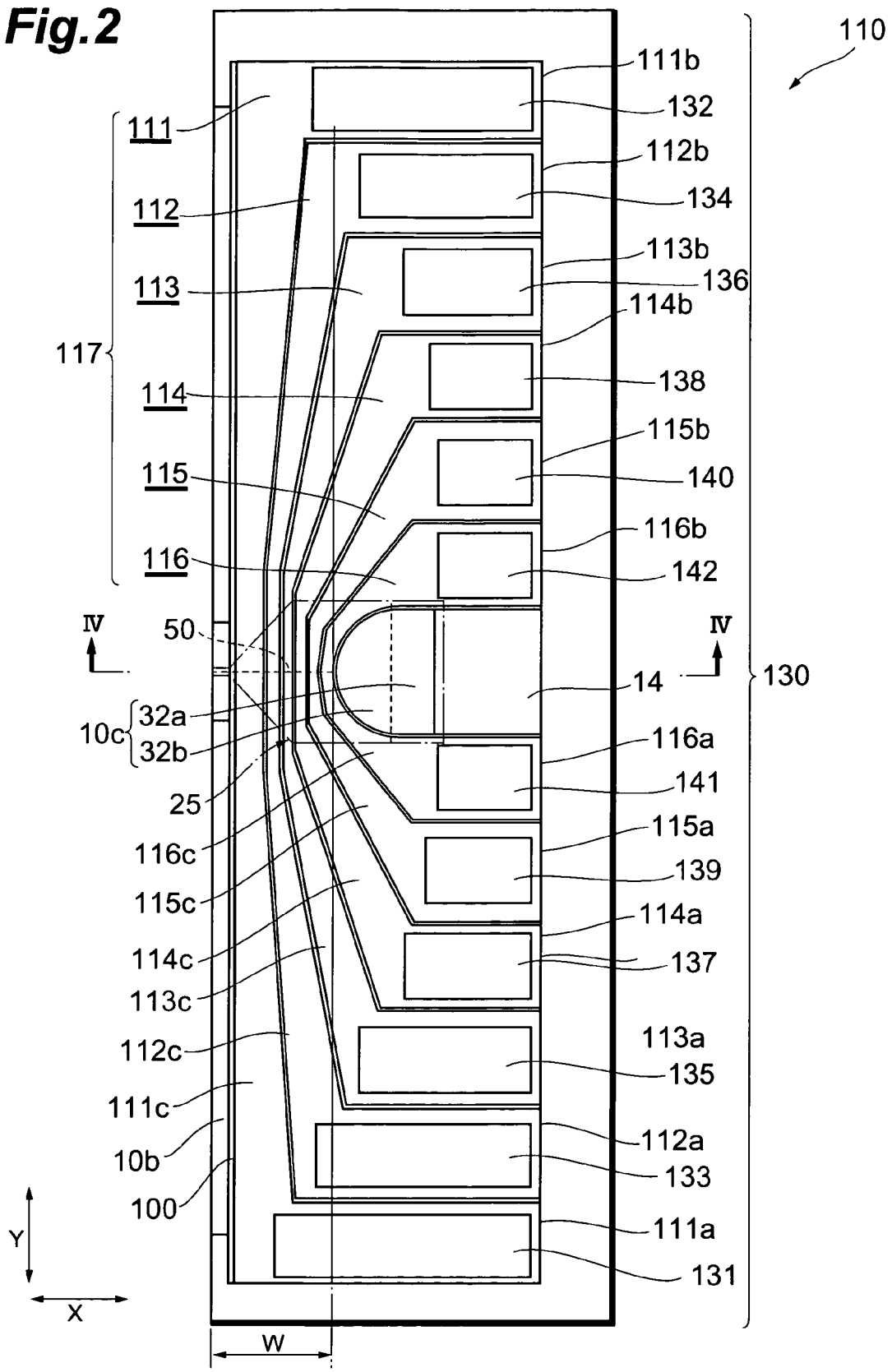
FIG. 2 is a plan view showing a first conductor group and a connecting part group which constitute a thin-film coil.
Figure 3:
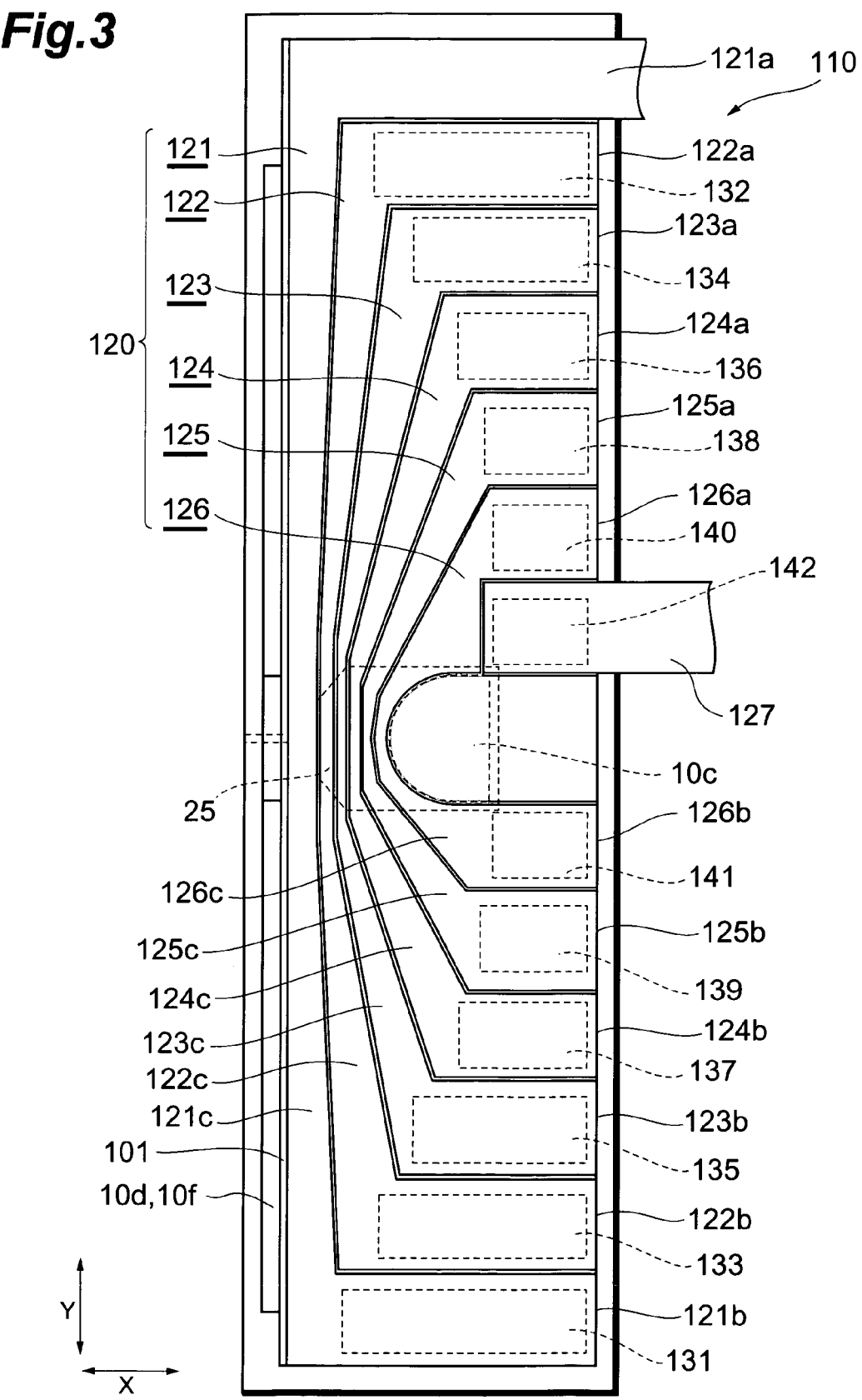
FIG. 3 is a plan view showing a second conductor group constituting the thin-film coil.

First, with reference to FIGS. 1 to 4, the structure of the thin-film magnetic head in accordance with the first embodiment of the present invention will be explained. Here, FIG. 1 is an exploded perspective view showing a main part of the thin-film magnetic head 300 in accordance with the first embodiment of the present invention. FIG. 2 is a plan view showing a first conductor group 117 and a connecting part group 130 which constitute a thin-film coil 110, whereas FIG. 3 is a plan view similarly showing a second conductor group 120. FIG. 4A is a sectional view taken along the line IV—IV of FIG. 2, whereas FIG. 4B is a sectional view parallel to an air bearing surface 30.

The thin-film magnetic head 300 in accordance with the first embodiment comprises a substrate 1, and a reproducing head and a recording head (inductive electromagnetic transducer) which are laminated on the substrate 1, while having the air bearing surface 30 acting as a medium-opposing surface opposing a recording medium. The structure of a main part of the thin-film magnetic head 300 will now be explained, whereas the other part of the structure of the thin-film magnetic head will be explained in manufacturing steps which will be set forth later.

The reproducing head comprises a GMR device 5 for detecting a magnetic signal, which is disposed near the air bearing surface 30. The reproducing head also comprises a lower shield layer 3 and an upper shield layer 8 which are disposed so as to oppose each other while holding and shielding the GMR device 5 therebetween on the air bearing surface 30 side, a lower shield gap film 4 disposed between the GMR device 5 and lower shield layer 3, and an upper shield gap film 7 disposed between the GMR device 5 and the upper shield layer 8.

The recording head comprises a lower magnetic pole layer 10, an upper magnetic pole layer 25, a recording gap layer 24, and a thin-film coil 110 which are laminated on the substrate 1. The lower magnetic pole layer 10 and upper magnetic pole layer 25 include respective magnetic pole parts (opposing magnetic pole parts) opposing each other on the side of the air bearing surface 30, and are magnetically connected to each other at a junction 31 which will be explained later. The recording gap layer 24 is formed between the opposing magnetic pole part of the lower magnetic pole layer 10 and the opposing magnetic pole part of the upper magnetic pole layer 25. The thin-film coil 110 is helically wound about the upper magnetic pole layer 25 while being insulated from the lower magnetic pole layer 10 and upper magnetic pole layer 25. The lower magnetic pole layer 10 and upper magnetic pole layer 25 in this embodiment correspond to the first and second magnetic pole groups in the present invention, respectively.

As shown in FIG. 4, the lower magnetic pole layer 10 comprises a first magnetic pole part 10a, a second magnetic pole part 10b, a third magnetic pole part 10c, a fourth magnetic pole part 10d, a fifth magnetic pole part 10e, a sixth magnetic pole part 10f, and a seventh magnetic pole part 10g.

The first magnetic pole part 10a is disposed so as to oppose a first conductor group 117 of the thin-film coil 110, which will be explained later. In the vicinity of the air bearing surface 30, the second magnetic pole part 10b is connected to the first magnetic pole part 10a so as to project toward the upper magnetic pole layer 25 than does the first magnetic pole part 10a. The third magnetic pole part 10c is connected to the first magnetic pole part 10a so as to project toward the upper magnetic pole layer 25 than does the first magnetic pole part 10a at a position separated from the air bearing surface 30 by way of the first conductor group 117 and a part of a second conductor group 120 which will be explained later. As shown in FIG. 2, the third magnetic pole part 10c comprises a pillar 32a and a protrusion 32b projecting from the pillar 32a toward the air bearing surface 30, whereas the protrusion 32b has a curved surface (cylindrical curved surface) forming a part of a cylinder. The pillar 32a is formed like a rectangular column.

The third magnetic pole part 10c, fifth magnetic pole part 10e, and seventh magnetic pole part 10g constitute the junction 31 magnetically connecting the upper magnetic pole layer 25 and the lower magnetic pole layer 10 to each other (see FIG. 4A). In the sixth magnetic pole part 10f, the part opposing a track width defining part 25A, which will be explained later, by way of the recording gap layer 24 is an opposing magnetic pole part in the present invention. In the portion opposing the track width defining part 25A, the width of the sixth magnetic pole part 10f with respect to the air bearing surface 30 is narrower than that of the fourth magnetic pole part 10d, whereby the recording gap layer 24 has a multistage structure.

As shown in FIG. 4B, the lower magnetic pole layer 10 and upper magnetic pole layer 25 have a trim structure. This trim structure prevents an effective recording track width from being increased by the spreading of magnetic fluxes generated at the time of writing a narrow track.

As shown in FIG. 1, the upper magnetic pole layer 25 comprises a first magnetic pole part 25a in contact with the recording gap layer 24 on the air bearing surface 30 side, and a second magnetic pole part 25b disposed on the first magnetic pole part 25a. The upper magnetic pole layer 25 also comprises a track width defining part 25A and a yoke part 25B. The track width defining part 25A is an opposing magnetic pole part in the present invention and defines a recording track width. The track width defining part 25A includes an end part disposed on the air bearing surface 30, and an arm part extending from the end part so as to connect with the yoke part 25B. The yoke part 25B comprises a fixed width part having a constant width, and a taper part whose width gradually decreases down from the fixed width part to the track width defining part 25A.

The thin-film coil 110 comprises the first conductor group 117, second conductor group 120, and connecting part group 130, which are connected to each other, so as to form a series of 6-turn loops helically wound about the upper magnetic pole layer 25.

As shown in FIGS. 2 and 4A, the first conductor group 117 comprises first inner conductor parts 111, 113, 115 and second inner conductor parts 112, 114, 116 disposed between the lower magnetic pole layer 10 and upper magnetic pole layer 25. The first conductor group 117 has an insulating contact structure in which those adjacent each other in the inner conductor parts 111 to 116 are in contact with each other by way of a separation insulating film 15 which will be explained later, and is disposed in a region where the insulating film 11 is arranged in the first magnetic pole part 10a. The inner conductor part 111 is in contact by way of the separation insulating film 15 with an inner relaxing part 100 which will be explained later, whereas the inner conductor part 116 is in contact by way of the separation insulating film 15 with the third magnetic pole part 10c (see FIGS. 1 and 4A).

The inner conductor parts 111 to 116 comprise respective rectangular both end parts 111a to 116a and 111b to 116b, and respective joints 111c to 116c therebetween elongated in the direction (Y direction in FIG. 2) along the air bearing surface 30. The first conductor group 117 has a density changing structure in which the density of arrangement varies in a direction intersecting the air bearing surface 30 (intersecting direction, i.e., X direction in FIGS. 2 and 3) in the joints 111c to 116c. Namely, the number (arrangement number) of inner conductor parts 111 to 116 arranged in an area having a width w equal to the length of the shortest line 50 from the air bearing surface 30 to the protrusion 32b gradually increases from 1 to 6 from the outside of the upper magnetic pole layer 25 to the upper magnetic pole layer 25. This constructs the first conductor group 117 is arranged such that the inner conductor parts 111 to 116 gradually concentrate toward the upper magnetic pole layer 25, thereby reducing the winding pitch.

The inner conductor parts 111 to 116 also have a variable width structure in which their widths (path widths) in a direction intersecting directions of their respective current flows gradually increase from the portion corresponding to the upper magnetic pole layer 25 to the outside thereof, and include the narrowest part having the narrowest path width at a position corresponding to the protrusion 32*b* of the third magnetic pole part 10*c*.

The separation insulating film 15 is formed with a thickness not greater than the shortest distance between the bottom part of the first conductor group 117 and the lower magnetic pole layer 10. Namely, as shown in FIG. 4A, the shortest distance between the first conductor group 117 and the lower magnetic pole layer 10 equals the thickness of the insulating film 11 interposed between the bottom part of the inner conductor parts 111, 113, 115 and the lower magnetic pole layer 10, whereas the thickness of the separation insulating film 15 is not greater than that of the insulating film 11.

As shown in FIG. 3, the second conductor group 120 comprises first outer conductor parts 121, 123, 125 and second outer conductor parts 122, 124, 125 which are arranged on a plane different from that of the first conductor group 117 on the outside of the upper magnetic pole layer 25. The second conductor group 120 has an insulating contact structure in which those adjacent each other in the outer conductor parts 121 to 126 are in contact with each other by way of a separation insulating film 34. The outer conductor part 121 is in contact by way of the separation insulating film 34 with an outer relaxing part 101 which will be explained later, whereas the outer conductor part 126 is in contact by way of the separation insulating film 34 with an insulating part 33 (see FIG. 4A).

The outer conductor parts 121 to 126 comprise respective rectangular both end parts 121*a* to 126*a* and 121*b* to 126*b*, and respective joints 121*c* to 126*c* therebetween elongated in the direction along the air bearing surface 30. As with the first conductor group 117, the second conductor group 120 has a density changing structure in which the arrangement density varies in a direction intersecting the air bearing surface 30 in the joints 121*c* to 126*c* in the outer conductor parts 121 to 126.

The outer conductor parts 121 to 126 also have a variable width structure in which their path widths gradually increase from the portion corresponding to the upper magnetic pole layer 25 to the outside thereof, and includes that the narrowest part having the narrowest path width is located at a position corresponding to the protrusion 32*b* of the third magnetic pole part 10*c*.

The connecting part group 130 comprises a plurality of connecting parts 131 to 141. The connecting parts 131 to 141 are provided in order to connect the inner conductor parts 111 to 116 to their corresponding outer conductor parts 121 to 126, and arranged along the air bearing surface 30 on the outside of the upper magnetic pole layer 25 in the following manner. Namely, the connecting parts 131, 133, 135, 137, 139, 141 are disposed so as to connect the rectangular end parts 121*b* to 126*b* of the outer conductor parts 121 to 126 to the rectangular end parts 111*a* to 116*a* of the inner conductor parts 111 to 116, respectively. The connecting parts 132, 134, 136, 138, 140 are disposed so as to connect the rectangular end parts 122*a* to 126*a* of the outer conductor parts 122 to 126 to the rectangular end parts 111*b* to 115*b* of the inner conductor parts 111 to 115, respectively. The connecting part 142 is disposed so as to connect a lead layer 127 to the rectangular end part 116*b* of the inner conductor part 116.

The thin-film coil 110 connects the outer conductor part 121 to the inner conductor part 111 by way of the connecting part 131, and the inner conductor part 111 to the outer conductor part 122 by way of the connecting part 132, thereby forming a 1-turn loop. Similarly, 5-turn loops are formed, whereby the thin-film coil 110 forms a series of helical loops as a whole. Thereafter, the thin-film coil 110 is connected to an undepicted electrode pad from the lead layer 127. (An undepicted electrode pad is also connected to the outer conductor part 121.)

In the thin-film magnetic head 300, the inner conductor part 111 disposed on the air bearing surface 30 side of the thin-film coil 110 and the outer conductor part 121 similarly disposed on the air bearing surface 30 side are in contact with the inner relaxing part 100 and outer relaxing part 101 by way of the separation insulating films 15, 34, respectively. The inner relaxing part 100 and outer relaxing part 101 are formed in contact with the second magnetic pole part 10*b* and insulating part 33 between the air bearing surface 30 and the inner conductor part 111, outer conductor part 121, respectively. Each of the inner relaxing part 100 and outer relaxing part 101 is made of a material softer than at least one of the thin-film coil 110, lower magnetic pole layer 10 and upper magnetic pole layer 25 and can be formed by a technique of applying a photoresist, a polyimide resin, a SOG (Spin on Glass) film, or the like with a spin coater, for example.

Preferably, each of the inner relaxing part 100 and outer relaxing part 101 has a self (thermal) expansion coefficient lower than at least one of the thin-film coil 110 and lower magnetic pole layer 10. This can suppress the force by which the second magnetic pole part 10*b* is pushed laterally (in the X direction) because of the self-expansion of the thin-film coil 110. The inner relaxing part 100 and outer relaxing part 101 may have a self (thermal) expansion coefficient higher than those of the thin-film coil 110 and lower magnetic pole layer 10, if the width in the X direction intersecting the air bearing surface 30 is adjusted so as to become narrower than those of the inner conductor part 111 and outer conductor part 121.

As in the foregoing, the thin-film coil 110 has an insulating contact structure, so that the inner conductor parts 111 to 116 constituting the first conductor group 117 are in contact with each other (by way of the separation insulating film 15), and the outer conductor parts 121 to 126 constituting the second conductor group 120 are in contact with each other (by way of the separation insulating film 34). Therefore, only an insulating film exists between those adjacent each other in the inner conductor parts 111 to 116 and outer conductor parts 121 to 126, and their gap equals the thickness of the corresponding insulating film (separation insulating film 15, 34). Thus, the inner conductor parts 111 to 116 are densely arranged with substantially no space between those adjacent each other, and the outer conductor parts 121 to 126 are densely arranged with substantially no space between those adjacent each other. Therefore, the yoke length can be shortened without narrowing the path widths of the inner and outer conductor parts so much. Since it is not necessary to narrow the path widths of the inner and outer conductor parts so much, current flows are inhibited less, whereby the rise in ohmic value is suppressed.

Since the third magnetic pole part 10*c* constitutes a part of the junction 31 magnetically connecting the upper magnetic pole layer 25 to the lower magnetic pole layer 10, the shortest distance between (the protrusion 32*b* of) the third magnetic pole part 10*c* and the air bearing surface 30, i.e., the length of the shortest line 50, becomes the yoke length. Therefore, the above-mentioned high density arrangements of the first conductor group 117 and second conductor group 120 allow the thin-film magnetic head 300 to attain a shorter yoke length.

Also, the inner conductor parts 111, 116 located on both sides of the first conductor group 117 are in contact with the inner relaxing part 100 and third magnetic pole part 10c, respectively, by way of only the separation insulating film 15, which contributes to further shortening the yoke length.

In the thin-film coil 110, the first conductor group 117 and second conductor group 120 have density changing structures. Therefore, even when the yoke length is shortened by narrowing the width W, windings are kept on the shortest line 50, whereby a number of turns of the thin-film coil 110 is secured. Hence, the thin-film magnetic head 300 can shorten the yoke length while keeping the number of turns. This realizes a thin-film magnetic head having excellent recording characteristics in high frequency bands. Also, the parts having density changing structures in the thin-film coil 110, i.e., the joints 111c to 116c and 121c to 126c, are arranged in close vicinity of the air bearing surface 30, whereby magnetic fluxes generated by the thin-film coil 110 are efficiently used for recording.

The inner relaxing part 100 is formed between the inner conductor part 111 and the second magnetic pole part 10b, whereas the outer relaxing part 101 is formed between the outer conductor part 121 and the insulating part 33. Each of the inner relaxing part 100 and outer relaxing part 101 is made of a material softer than at least one of the thin-film coil 110, lower magnetic pole layer 10 and upper magnetic pole layer 25. Therefore, even when the thin-film coil 110 expands itself by heat generated thereby, the broadening of the width due to the self-expansion of the thin-film coil 110 can be absorbed by the inner relaxing part 100 and outer relaxing part 101 adjacent thereto. Thus, the inner relaxing part 100 and outer relaxing part 101 act as a cushion material for absorbing the broadening of the width due to the self-expansion of the thin-film coil 110. Even when the thin-film coil 110 is more likely to expand itself because of the shortening of the turn width and higher density arrangements, the magnetic pole parts do not protrude toward the recording medium, whereby the yoke length can further be shortened while keeping the number of turns.

In particular, the thin-film magnetic head 300 is configured such that both the first and second conductor groups 117, 120 are formed with an insulating contact structure, whereas adjacent inner conductor parts 111 to 116 and adjacent outer conductor parts 121 to 126 are arranged with a high density such that only the separation insulating films 34, 15 are interposed therebetween. Therefore, the inner conductor parts 111 to 116 and outer conductor parts 121 to 126 are susceptible to self-expansions each other. Hence, in the thin-film magnetic head 300, actions of the inner relaxing part 100 and outer relaxing part 101 absorbing the broadening of the width due to the self-expansion of the thin-film coil 110 are more effective.

Further, the connecting parts connecting the inner conductor parts 111 to 116 to the outer conductor parts 121 to 126 are arranged along the air bearing surface 30 on the outside of the upper magnetic pole layer 25. This shortens the distance from the air bearing surface 30 to each connecting part. Therefore, the thin-film magnetic head 300 as a whole reduces its size, and thus can be made smaller.

Because of the above-mentioned variable width structures, the inner conductor parts 111 to 116 and outer conductor parts 121 to 126 are less likely obstruct current flows and can suppress the rise in ohmic value. Therefore, the thin-film magnetic head 300 can effectively restrain the thin-film coil 110 from generating heat. Since the third magnetic pole part 10 includes the protrusion 32b, the widths of the inner conductor parts 111 to 116 and outer conductor parts 121 to 126 vary in conformity to the protrusion 32b. Since the inner conductor parts 111 to 116 and outer conductor parts 121 to 126 have the narrowest parts at locations corresponding to the protrusion 32b, areas where the path width narrows are minimized. This makes it easier for currents to flow, and restrains the ohmic value from rising.

As will be explained later in detail, the separation insulating film 15 is constituted by laminating a plurality of thin alumina films formed by CVD, and thus is a dense film. Therefore, the second magnetic pole part 10b and each of the first conductor group 117 and third magnetic pole part 10c arranged on the shortest line 50 can reliably be insulated while making their intervals very short.

As will be explained later, a highly saturated magnetic flux density material can be used as a material for the second magnetic pole part 10b, fourth magnetic pole part 10d, sixth magnetic pole part 10f, and upper magnetic pole layer 25, and thus can prevent magnetic paths from being saturated with magnetic fluxes in the middle. As a result, the magnetomotive force generated by the thin-film coil 110 can efficiently be used for recording.

Meanwhile, the following problems may occur in particular when the recording track width becomes smaller in a thin-film magnetic head whose upper magnetic pole layer includes a magnetic pole part layer having a smaller width and a yoke part layer having a greater width connected to the upper face of the magnetic pole part layer as described in the above-mentioned Patent Document 1, for example. First, the cross-sectional area of the magnetic path drastically decreases at the connecting part between the magnetic pole part layer and yoke part layer in this kind of thin-film magnetic head, so that this part may be saturated with magnetic fluxes, whereby the magnetic fluxes may fail to be fully transmitted from the yoke part layer to the magnetic pole part layer. As a consequence, overwrite characteristics may deteriorate in such a thin-film magnetic head.

Also, the above-mentioned thin-film magnetic head whose upper magnetic pole layer includes the magnetic pole part layer and yoke part layer may generate so-called side writing in which magnetic flux leaks from the yoke part layer to a recording medium, whereby the yoke part layer having a large width writes data into an area of the recording medium other than the areas to record data, or so-called side erasing in which data is erased from an area which no data should be erased. In each case, the effective track width becomes greater than a desirable track width. The positional relationship between the magnetic pole part layer and yoke part layer is determined by the alignment in photolithography, thus may deviate from a desirable positional relationship. In this case, side writing and side erasing may occur remarkably.

In the above-mentioned thin-film magnetic head 300, by contrast, the upper magnetic pole layer 25 defining the track width is a flat layer, whereby magnetic fluxes are not saturated in the connecting part between the magnetic pole part layer and the yoke part layer. Therefore, the above-mentioned side writing and side erasing do not occur in this embodiment.

Also, since the thin-film magnetic head 300 forms a flat upper magnetic pole layer 25 on a flat base, the track width defining part of the upper magnetic pole layer 25 can be formed finely with a high precision. This can realize a track width of 0.2 μm or less, which has conventionally been considered difficult when mass-producing thin-film magnetic heads.

Method of Making Thin-Film Magnetic Head

With reference to FIGS. 5A and 5B to FIGS. 25A and 25B together with FIG. 1 to FIGS. 4A and 4B mentioned above, a method of manufacturing the thin-film magnetic head in accordance with the first embodiment having the above-mentioned structure will now be explained.

FIGS. 5A to 25A show cross sections corresponding to the line IV—IV of FIG. 2 in respective manufacturing steps. FIGS. 5B to 25B show cross sections of the opposing magnetic pole parts parallel to the air bearing surface 30.

First, in the manufacturing method in accordance with this embodiment, an insulating layer 2 made of alumina ($Al_2O_3$), for example, is deposited by a thickness of about 2 to 5 µm on a substrate 1 made of aluminum oxide titanium carbide ($Al_2O_3.TiC$) as shown in FIGS. 5A and 5B. Subsequently, a lower shield layer 3 for a reproducing head made of a magnetic material (e.g., permalloy) is deposited by a thickness of about 2 to 3 µm on the insulating layer 2. Using a photoresist as a mask, for example, the lower shield layer 3 is selectively formed on the insulating layer 2 by plating. Then, though not depicted, an insulating layer made of alumina, for example, is formed by a thickness of about 3 to 4 µm, for example, on the whole surface, and is polished, for example, by chemical mechanical polishing (hereinafter referred to as "CMP") until the lower shield layer 3 is exposed, so as to flatten the surface.

Next, on the lower shield layer 3, a lower shield gap film 4 as an insulating film is formed by a thickness of about 20 to 40 nm, for example. Subsequently, on the lower shield gap film 4, a GMR device 5 is formed by a thickness of several tens of nanometers. The GMR device 5 is formed by selectively etching a GMR film formed by sputtering, for example. The GMR device 5 is disposed near a position where the air bearing surface 30 is formed. For the GMR device 5, a device using a magnetosensitive film exhibiting a magnetoresistive effect such as an AMR device, MR device, or TMR (tunneling magnetoresistive) device can be used.

Subsequently, though not depicted, a pair of electrode layers electrically connected to the GMR device 5 are formed by a thickness of several tens of nanometers on the lower shield gap film 4. Further, on the lower shield gap film 4 and GMR device 5, an upper shield gap film 7 as an insulating film is formed by a thickness of about 20 to 40 nm, for example, so as to bury the GMR device 5 into the lower shield gap film 4 and upper shield gap film 7. (The boundary between the lower shield gap film 4 and upper shield gap film 7 is not shown for convenience of illustration.) Examples of insulating materials for use in the lower shield gap film 4 and upper shield gap film 7 include alumina, aluminum nitride, and diamond-like carbon (DLC). The lower shield gap film 4 and upper shield gap film 7 may be formed by sputtering or chemical vapor deposition (hereinafter referred to as "CVD").

Next, on the upper shield gap film 7, an upper shield layer 8 for a reproducing head made of a magnetic material is selectively formed from NiFe, for example, by a thickness of about 1.0 to 1.5 µm. Subsequently, on the whole upper face of the laminate obtained by the foregoing steps, an insulating layer 9 made of alumina, for example, for separating the upper shield layer 8 from a recording head which will be formed later is formed by a thickness of about 0.2 to 0.3 µm, for example.

Then, as shown in FIGS. 6A and 6B, a first magnetic pole part 10a constituting a lower magnetic pole layer 10 as the first magnetic pole layer in the present invention is formed by a thickness of 0.5 to 1.0 µm, for example, on the insulating layer 9.

In this case, using CoNiFe (2.3 T), CoFeN (2.4 T), or the like which is a highly saturated magnetic flux density material as a material, the first magnetic pole part 10a is formed by sputtering. Using NiFe (Ni: 80 wt %; Fe: 20 wt %) or NiFe (Ni: 45 wt %; Fe: 55 wt %), which is a highly saturated magnetic flux density material, as a material, the first magnetic pole part 10a may be formed by plating. Assumed here as an example is a case where the first magnetic pole part 10a is formed from CoNiFe having a saturated magnetic flux density of 2.3 T or CoFeN having a saturated magnetic flux density of 2.4 T by sputtering.

Next, on the first magnetic pole part 10a, an insulating film 11 made of alumina, for example, is formed by a thickness of 0.2 µm, for example. Subsequently, the insulating film 11 is selectively etched, so as to form the insulating film 11 with openings at positions where the second magnetic pole part 10b and third magnetic pole part 10c should be formed.

Then, though not depicted, an electrode layer film made of a conductive material is formed by a thickness of about 50 to 80 nm by sputtering, for example, so as to cover the first magnetic pole part 10a and insulating film 11. This electrode film functions as an electrode and seed layer at the time of plating.

Further, though not depicted, a frame is formed on the electrode film by photolithography. This frame is formed in order to provide first inner conductor parts 111, 113, 115, which constitute a thin-film coil 110, by plating.

Subsequently, as shown in FIGS. 7A and 7B, electroplating is carried out while using the electrode film, so as to form a plating layer made of Cu (copper), for example. This plating layer and an undepicted electrode film thereunder constitute the first inner conductor parts 111, 113, 115. The thickness of each of the first inner conductor parts 111, 113, 115 is 3.0 to 3.5 µm, for example. Though not depicted in FIGS. 7A and 7B, rectangular end parts are formed together with the plating layer. After removing the frame, the electrode film is eliminated by ion beam etching, for example, except for the portions located under the first inner conductor parts 111, 113, 115 (including their rectangular end parts).

Then, though not depicted, a frame is formed on the first magnetic pole part 10a and insulating film 11 by photolithography. This frame is formed in order to provide a second magnetic pole part 10b and a third magnetic pole part 10c by frame plating.

Subsequently, electroplating is carried out, so as to form the third magnetic pole part 10c disposed at a position for determining a yoke length and the second magnetic pole part 10b as the second magnetic pole layer in the present invention, each from a magnetic material by a thickness of 3.5 to 4.0 µm, for example. Here, an inner relaxing part gap 102 for forming an inner relaxing part 100 is provided between the second magnetic pole part 10b and the first inner conductor part 111 so as to be placed adjacent the first inner conductor part 111. Here, the inner relaxing part gap 102 is narrower than the first inner conductor part 111.

For example, a highly saturated magnetic flux density material is used as a material for the second magnetic pole part 10b and third magnetic pole part 10c. For instance, CoNiFe having a saturated magnetic flux density of 2.3 T or CoFeN having a saturated magnetic flux density of 2.4 T can be used. For forming the second magnetic pole part 10b and third magnetic pole part 10c by electroplating in this embodiment, the unpatterned first magnetic pole part 10a is used as an electrode and seed layer at the time of forming the second magnetic pole part 10b and third magnetic pole part 10c by electroplating without any particular electrode film.

Instead of forming the second magnetic pole part 10b and third magnetic pole part 10c after forming the first inner conductor parts 111, 113, 115 as mentioned above, the first inner conductor parts 111, 113, 115 may be formed after forming the second magnetic pole part 10b and third magnetic pole part 10c.

Further, as shown in FIGS. 8A and 8B, a separation insulating film 15 made of alumina (having a thickness of about 0.1 μm) for separating the inner conductor parts, second magnetic pole part 10b, and third magnetic pole part 10c is formed by CVD, for example. This forms a plurality of inner grooves covered with the separation insulating film 15 between the second magnetic pole part 10b and the inner conductor part 111, i.e., at the inner relaxing part gap 102, between the inner conductor parts 111, 113, 115, and between the inner conductor part 115 and the third magnetic pole part 10c. Preferably, the thickness of the separation insulating film 15 is not greater than that of the insulating film 11, i.e., 0.2 μm or less, within the range of 0.08 to 0.15 μm in particular. For example, the separation insulating film 15 may be a film formed by CVD in which $H_2O$, $N_2$, $N_2O$, or $H_2O_2$ as a material used for forming a thin film and $Al(CH_3)_3$ or $AlCl_3$ as a material used for forming a thin film are intermittently emitted in an alternating fashion at a temperature of 100° C. or higher under reduced pressure. This forming method yields the separation insulating film 15 having a desirable thickness by laminating a plurality of thin alumina films, whereby the inner conductor parts can reliably be insulated while narrowing gaps therebetween.

Next, as shown in FIGS. 9A and 9B, a film made of a photoresist, polyimide resin, SOG, or the like is selectively formed at the inner relaxing part gap 102 covered with the separation insulating film 15. This forms an inner relaxing part 100 at the inner relaxing part gap 102. Thereafter, an insulating film 16 covering the second magnetic pole part 10b and third magnetic pole part 10c is selectively formed, and then an electrode film 17a made of Cu is formed by a thickness of about 200 to 500 angstroms on the whole surface of the laminate. The electrode film 17a is made by forming a first conductive film by sputtering and then forming a second conductive film thereon by CVD, and functions as an electrode and seed layer in plating which will be carried out later. Subsequently, plating is carried out, so that a conductive layer 17b made of Cu, for example, is selectively formed by a thickness of about 3 to 5 Mm. As a consequence, the conductive layer 17b is reliably buried in the inner grooves between the first inner conductor parts 111, 113, 115 and the third magnetic pole part 10c.

Then, as shown in FIGS. 10A and 10B, the electrode film 17a is selectively etched by ion beam etching, for example, while using the conductive layer 17b as a mask. Subsequently, an insulating film 18 made of alumina is formed by a thickness of about 4 to 6 μm so as to cover the whole upper face of the laminate.

Next, as shown in FIGS. 11A and 11B, the surface covered with the insulating film 18 is polished by CMP until the first inner conductor parts 111, 113, 115 are exposed, so as to flatten the surface. As a result of the polishing, the conductive layer 17b and electrode film 17a remaining in the inner grooves, i.e., between the first inner conductor parts 111, 113, 115 and between the first inner conductor part 115 and third magnetic pole part 10c, form second inner conductor parts 112, 114, 116. Thus obtained second inner conductor parts 112, 114, 116 and the above-mentioned first inner conductor parts 111, 113, 115 form a first conductor group 117. The second inner conductor parts 112, 114, 116 are formed as being buried in the respective inner grooves and thus are arranged adjacent the first inner conductor parts 111, 113, 115. Only the separation insulating film 15 is interposed between the second inner conductor parts 112, 114, 116 and their adjacent first inner conductor parts 111, 113, 115. Thus, the first inner conductor parts 111, 113, 115 and the second inner conductor parts 112, 114, 116 form insulating contact structures with respect to each other. Further, the inner relaxing part 100 is formed between the first inner conductor part 111 and the second magnetic pole part 10b.

Next, as shown in FIGS. 12A and 12B, an insulating film 20 made of alumina, for example, is formed by a thickness of 0.2 μm, for example, so as to cover the whole upper face of the laminate. Of the insulating film 20, the portion corresponding to the second magnetic pole part 10b, the portion corresponding to the third magnetic pole part 10c, and the portions corresponding to the rectangular end parts of the inner conductor parts 111 to 116 are selectively etched away, so as to form openings. Subsequently, on the second magnetic pole part 10b and third magnetic pole part 10c exposed by etching, a fourth magnetic pole part 10d and a fifth magnetic pole part 10e which constitute the third magnetic pole layer in the present invention are made by frame plating, for example, so as to form the lower connecting layer in the present invention on the rectangular end parts of the inner conductor parts 111 to 116. FIG. 12A does not illustrate the lower connecting part layer and rectangular end parts. For example, each of the fourth magnetic pole part 10d and fifth magnetic pole part 10e can be formed by a thickness of 0.3 to 0.5 μm while using CoNiFe having a saturated magnetic flux density of 2.3 T or CoFe having a saturated magnetic flux density of 2.4 T as a material.

Further, as shown in FIGS. 13A and 13B, an insulating film 21 made of alumina is formed by a thickness of 0.5 to 0.8 μm, for example, so as to cover the whole upper face of the laminate. Then, the surface is polished by CMP, for example, such that each of the fourth magnetic pole part 10d and fifth magnetic pole part 10e attains a thickness of 0.3 to 0.5 μm.

Subsequently, a magnetic layer 22 is formed by a thickness of 0.3 to 0.5 μm by sputtering so as to cover the whole upper face of the laminate. As a material for the magnetic layer 22, CoFeN can be used, for example. Further, a photoresist is formed so as to cover the whole upper face of the laminate, and then is patterned with a predetermined photomask so as to open at a portion between the fourth magnetic pole part 10d and the fifth magnetic pole part 10e, thus leaving a photoresist 41.

Figure 14B:
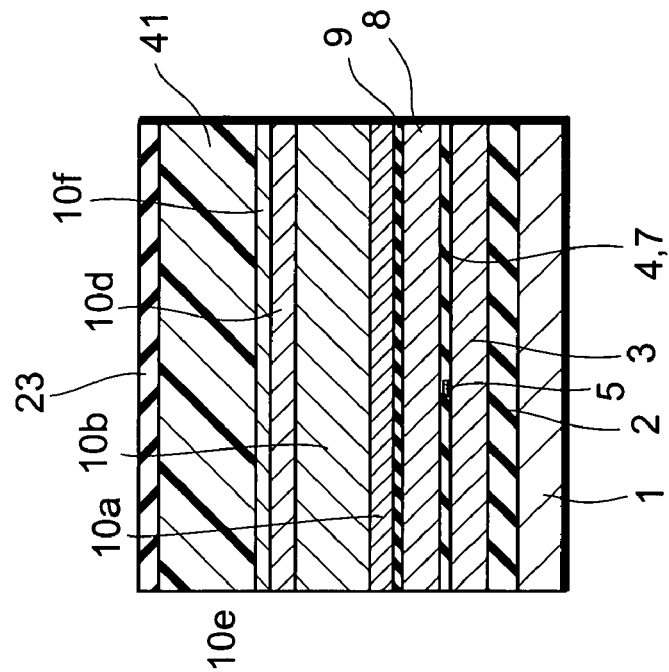
FIGS. 14A and 14B are sectional views showing a step subsequent to that of FIGS. 13A and 13B.
Figure 14A:
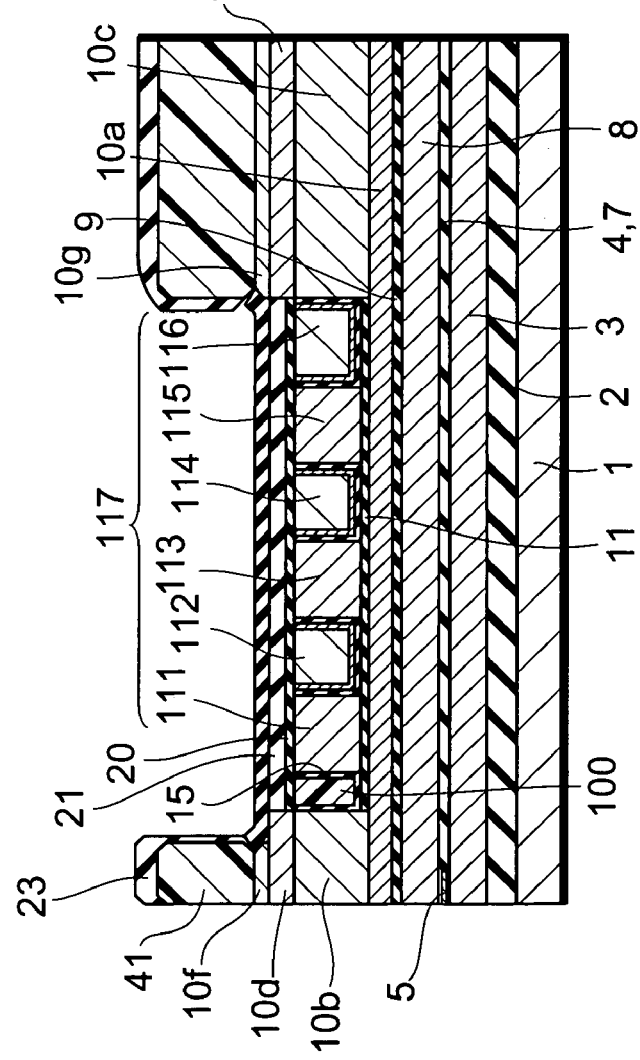

Next, as shown in FIGS. 14A and 14B, ion beam etching is carried out while using the photoresist 41 as a mask, so as to etch away the portion of the magnetic layer 22 not covered with the photoresist 41. Further, an insulating film 23 made of alumina is formed by a thickness of 0.3 to 0.6 μm (RE-FEEL) so as to cover the whole upper face of the laminate while using the photoresist 41 as a mask. When the insulating film 23 and photoresist 41 are eliminated, a sixth magnetic pole part 10f and a seventh magnetic pole part 10g which constitute the third magnetic pole layer in the present invention are obtained as shown in FIGS. 15A and 15B. Thus obtained sixth magnetic pole part 10f and seventh magnetic pole part 10g and the above-mentioned first magnetic pole part 10a, second magnetic pole part 10b, third magnetic pole part 10c, fourth magnetic pole part 10d, and fifth magnetic pole part 10e form the first magnetic pole group in the present invention.

Since the insulating film 23 and the sixth magnetic pole part 10f and seventh magnetic pole part 10g include raised edges, their surfaces are lightly polished by CMP. Thereafter, as shown in FIGS. 16A and 16B, a gap film 26 is formed by a thickness of 0.08 μm so as to cover the whole surface of the laminate, and is provided with an opening so as to expose the seventh magnetic pole part 10g. Though the gap film 26 can be formed from $SiO_2$, Ru, AlCu, or the like, it is assumed to be formed from alumina here.

Then, as shown in FIGS. 17A and 17B, a magnetic layer 40 made of CoFeN, for example, is formed by a thickness of 0.2 to 0.5 μm by sputtering so as to cover the whole upper face of the laminate in order to form a first magnetic pole part 25a. Further, a photoresist is applied so as to cover the whole upper face of the laminate, and then is patterned with a predetermined photomask so as to leave the portion of the first magnetic pole part 25a, thus forming a photoresist 42. Using the remaining photoresist 42 as a mask, the magnetic layer 40 is subjected to ion beam etching, and then an insulating film 27 made of alumina is formed by a thickness of 0.2 to 0.6 μm (RE-FEEL). Thereafter, liftoff is carried out so as to remove the photoresist 42 together with the insulating film 27, whereby the magnetic layer 40 remains in the portion covered with the photoresist 42 as shown in FIGS. 18A and 18B.

Since the insulating film 27 and magnetic layer 40 include raised edges, their surfaces are lightly polished by CMP. Thereafter, as shown in FIGS. 19A and 19B, a magnetic layer 43 made of CoFeN (2.4 T), for example, is formed by a thickness of 0.8 to 1.5 μm by sputtering so as to cover the whole surface of the laminate in order to form a second magnetic pole part 25b. The magnetic layer 43 may be formed on the whole surface by plating with CoFe or CoNiFe.

Subsequently, as shown in FIGS. 20A and 20B, an insulating film 35 made of alumina is formed by a thickness of 1.0 to 2.0 μm so as to cover the whole surface of the laminate. Thereafter, an electrode film (not depicted) to become a seed layer for plating is formed so as to cover the whole surface of the laminate, and a plating film 36 is formed thereon by a thickness of 0.5 to 1.0 μm. Also, using a resist pattern not depicted, the plating film 36 is etched away except for its portion corresponding to the track width defining part. The remaining portion of the plating film 36 is used for etching the undepicted electrode film. The plating film 36 is formed from any of CoNiFe, CoFe, and NiFe by a thickness on the order of 0.5 to 1.0 ||m.

Next, as shown in FIGS. 21A and 21B, the insulating film 35 is subjected to reactive ion etching (hereinafter referred to as "RIE") with a halogen gas containing $Cl_2$ and $BCl_3$ at a ratio of 4:1 or 5:1 while using the remaining plating film 36 as a mask.

Subsequently, as shown in FIGS. 22A and 22B, the magnetic layers 40 and 43 are subjected to RIE at a temperature within the range of 50° C. to 300° C., preferably at 200° C.±50° C. with a $Cl_2$ gas or a halogen gas containing $Cl_2$ and $CO_2$ while using the insulating film 35 as a mask. Further, while using the insulating film 35 as a mask, RIE is carried out for the gap film 26 with a halogen gas containing $Cl_2$ and $BCl_3$, and then for the sixth magnetic pole part 10f with $Cl_2$ gas or a halogen gas containing $Cl_2$ and $CO_2$. This yields a trim structure as shown in FIG. 22B.

Here, the portions of the gap film 26 located between the sixth magnetic pole part 10f and the first magnetic pole part 25a and the portion of the insulating film 23 disposed at the fifth magnetic pole part 10d become the recording gap layer 24, whereby the recording gap layer 24 attains a multistage configuration. The remaining portion of the magnetic layer 40 becomes the first magnetic pole part 25a, whereas the remaining portion of the magnetic layer 43 becomes the second magnetic pole part 25b. The first magnetic pole part 25a and second magnetic pole part 25b form the second magnetic pole group (upper magnetic pole layer 25) in the present invention on the lower magnetic pole layer 10. The inside end part of the sixth magnetic pole part 10f away from the air bearing surface 30 gives a throat height of the recording head. The throat height indicates the distance (length) h from the end part on the air bearing surface 30 side to the opposite (inside) end part in the parts of two magnetic pole layers opposing each other by way of the recording gap layer 24, i.e., opposing magnetic pole parts.

Further, as shown in FIGS. 23A and 23B, an insulating film 37 made of alumina, for example, is formed by a thickness of 2 to 3 μm so as to cover the whole upper face of the laminate, and thus obtained surface is polished by CMP so as to be flattened. After selectively etching away the portion of the insulating film 37 located on the lower connecting layer, an upper connecting layer is formed by frame plating. This forms a connecting part group 130. Then, an insulating film 39 made of alumina is formed by a thickness of 0.2 μm, for example, in the areas of first outer conductor parts 121, 123, 125, and second outer conductor parts 122, 124, 126 and an outer relaxing part 101 which will be formed later. For forming the first outer conductor parts 121, 123, 125 by way of the insulating film 39, an undepicted electrode film is formed on the insulating film 39, and then electroplating is carried out with this electrode film, so as to form a plating layer made of Cu (copper), for example. This plating layer and an undepicted electrode film thereunder constitute the first outer conductor parts 121, 123, 125. Rectangular end parts are formed together with the plating layer.

A photoresist 44 is formed so as to cover the whole upper face of the laminate, and then is patterned with an undepicted photomask so as to be left in the areas of the first outer conductor parts 121, 123, 125, and the second outer conductor parts 122, 124, 126 and an outer relaxing part gap 103 which will be formed later. Thereafter, an insulating film 33 made of alumina is formed again by a thickness of 4 to 5 μm.

Next, as shown in FIGS. 24A and 24B, the insulating film 33 is polished by CMP until the photoresist 44 is exposed, so as to flatten the surface. Then, the remaining portion of the insulating film 33 becomes an insulating part in the present invention.

Subsequently, as shown in FIGS. 25A and 25B, the portion of photoresist 44 exposed by CMP is eliminated, and then an insulating film made of alumina is formed by a thickness of 0.1 μm as a separation insulating film 34 so as to cover the whole upper face of the laminate. Here, the outer relaxing part gap 103 is formed between the first outer conductor part 121 and the insulating film 33.

Thereafter, a film made of a photoresist, polyimide resin, SOG, or the like is formed so as to cover the outer relaxing part gap 103 coated with the separation insulating film 34 as in the case of the inner relaxing part gap 102. This forms the outer relaxing part 101 at the outer relaxing part gap 103. Subsequently, an electrode film 37a made of Cu is formed by a thickness of about 500 to 800 angstroms by CVD on the whole surface of the laminate. This electrode film 37a functions as an electrode and seed layer for plating which will be carried out later. Further, a conductive layer 37b made of Cu, for example, is formed on the whole surface by a thickness of about 3 to 4 μm. As a consequence, the conductive layer 37b is reliably buried in outer grooves between the first outer conductor parts 121, 123, 125 and the insulating film 33.

Then, as shown in FIGS. 4A and 4B, the electrode film 37a and conductive layer 37b are polished by CMP until the first outer conductor parts 121, 123, 125 are exposed, so as to flatten the surface. As a result of the polishing, the conductive layer 37b and electrode film 37a remaining in the outer grooves, i.e., between the first outer conductor parts 121, 123, 125 and between the first outer conductor part 125 and the insulating film 33 form the second outer conductor parts 122, 124, 126. Thus obtained second outer conductor parts 122, 124, 126 and the above-mentioned first outer conductor parts 121, 123, 125 form a second conductor group 120.

The resulting second outer conductor parts 122, 124, 126 are formed as being buried in the respective outer grooves, and thus are arranged so as to adjoin the first outer conductor parts 121, 123, 125. Since only the separation insulating film 34 is interposed between the second outer conductor parts 122, 124, 126 and their adjacent first outer conductor parts 121, 123, 125, the first outer conductor parts 121, 123, 125 and the second outer conductor parts 122, 124, 126 form insulating contact structures with respect to each other. The outer relaxing part 101 is formed between the first outer conductor part 121 and the insulating film 33.

Further, an insulating film (overcoat layer) 29 made of alumina, for example, is formed so as to cover the whole upper face of the laminate, whereby the first conductor group 117, second conductor group 120, and connecting part layer group 130 form the thin-film coil 110, thereby yielding the thin-film magnetic head 300.

Thus obtained thin-film magnetic head 300 has the above-mentioned configuration, and thereby achieves better recording characteristics in high frequency bands without raising the ohmic value. In the above-mentioned manufacturing steps, a plurality of grooves covered with a separation insulating film are formed between the first inner conductor parts and first outer conductor parts and are provided with the second inner conductor parts and second outer conductor parts, so as to yield the thin-film coil 110. Since the first inner conductor parts and first outer conductor parts formed earlier function as frames for the second inner conductor parts and second outer conductor parts which will be formed later, gaps of the conductor parts are not affected by widths of frames obtained in the manufacturing process. Therefore, even when the conductor parts to be formed earlier are formed by frame plating, insulating contact structures can minimize gaps between the conductor parts. Since both of the first conductor group 117 and second conductor group 120 are formed with the inner relaxing part 100 and the outer relaxing part 101, the above-mentioned manufacturing steps yield the thin-film magnetic head 300 which can effectively absorb the self-expansion of the thin-film coil 110.

First to fourth modified examples of the structure of the above-mentioned thin-film magnetic head 300 will now be explained.

FIRST MODIFIED EXAMPLE

Figure 26:
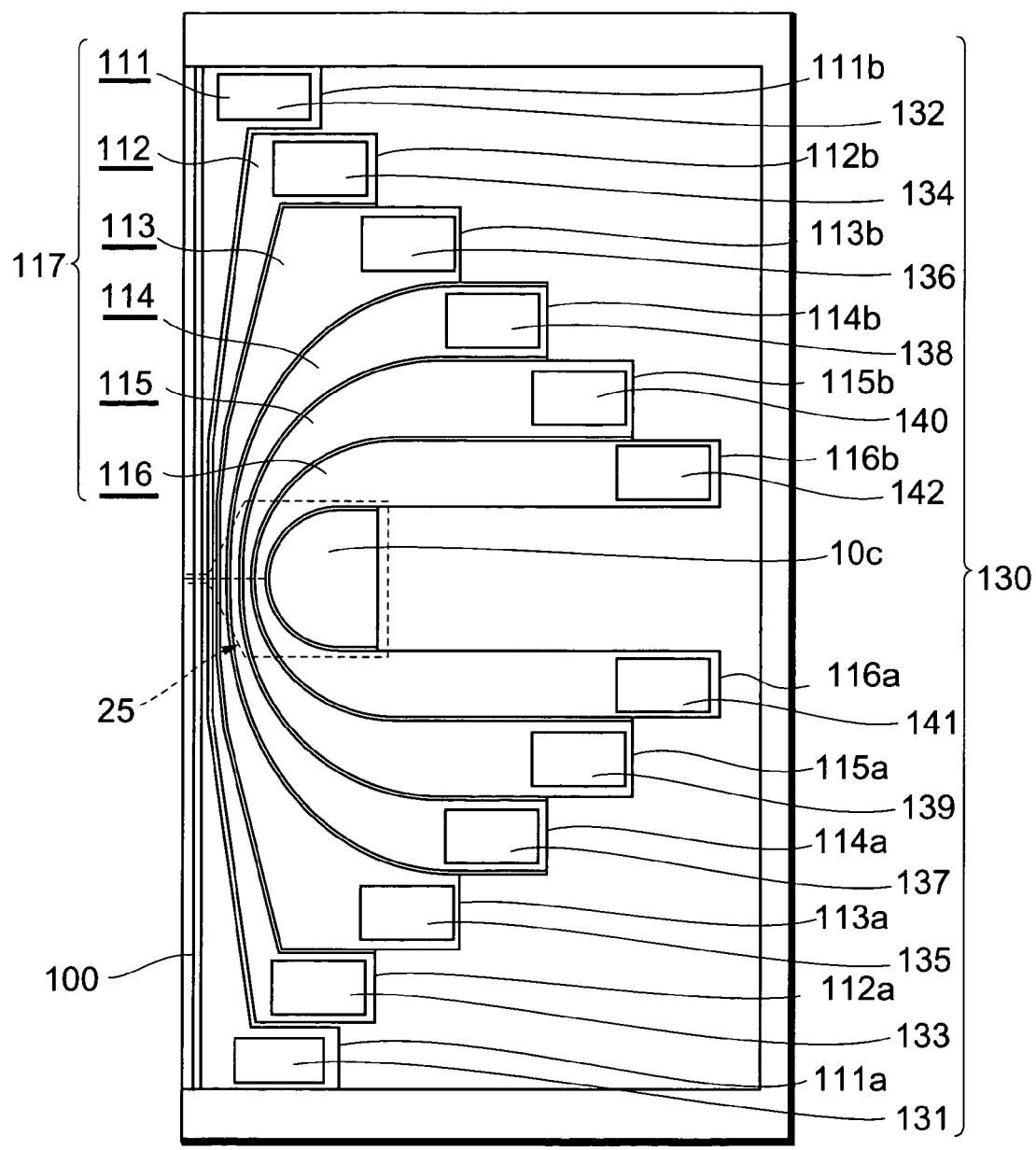
FIG. 26 is a plan view showing the first conductor group and connecting part group constituting the thin-film magnetic head in a first modified example.

The thin-film magnetic head 300 in accordance with the first modified example is the same as that mentioned above except for the configuration of the thin-film coil, and thus will be explained in terms of their difference while omitting or simplifying their common features. FIG. 26 is a plan view showing the first conductor group 117 and connecting parts in the thin-film coil in the first modified example, whereas FIG. 27 is a plan view similarly showing the second conductor group 120.

Figure 27:
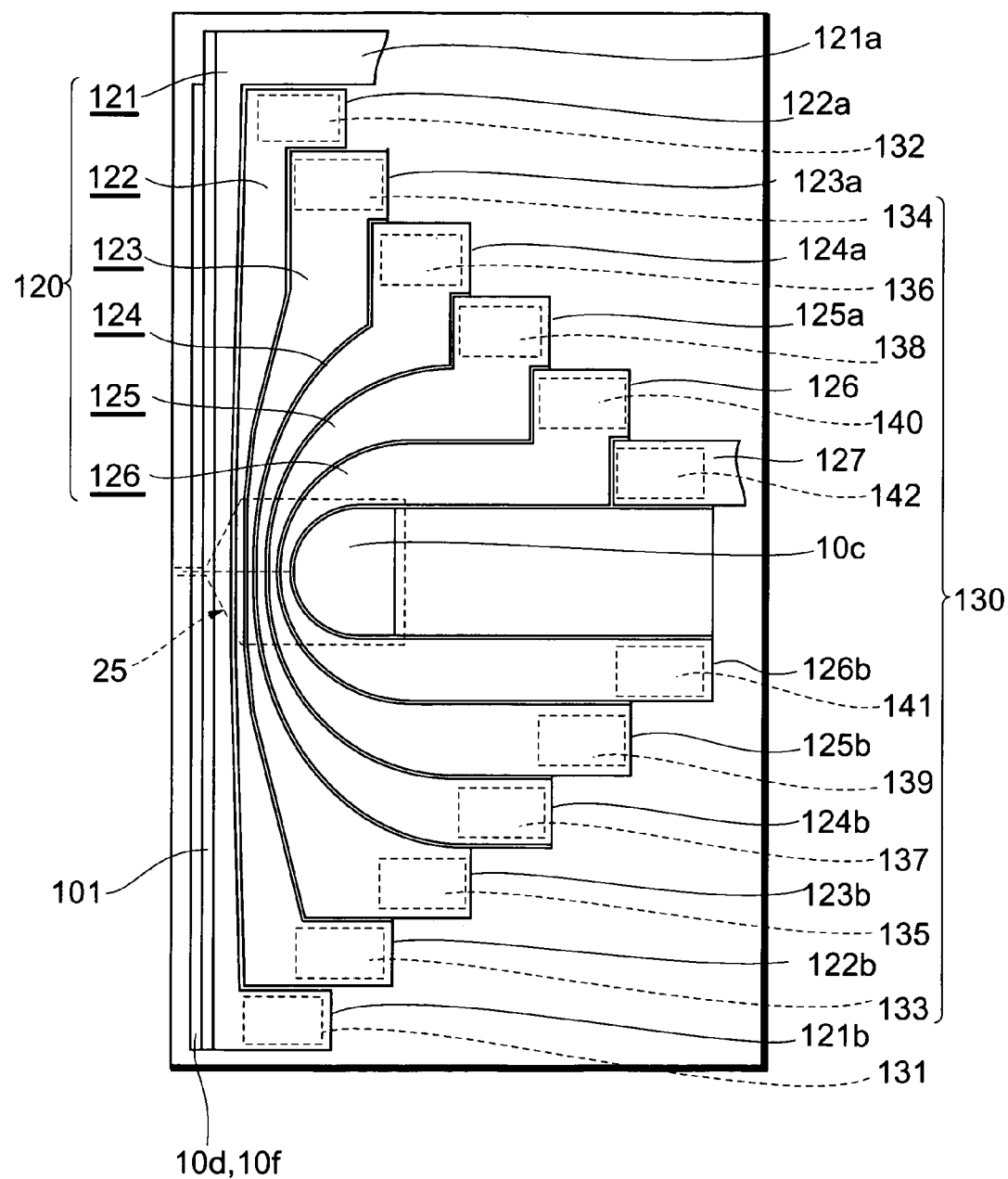
FIG. 27 is a plan view showing the second conductor group similarly.

As shown in FIGS. 26 and 27, the thin-film coil in the first modified example comprises the first conductor group 117, second conductor group 120, and connecting part group 130, whereas the configuration of the connecting part group 130 differs from that of the first embodiment. The connecting part group 130 in the first modified example comprises a plurality of connecting parts 131 to 142 which are arranged at respective positions such that the distance from the air bearing surface 30 varies between those adjacent each other. Namely, the distance from the air bearing surface 30 successively increases in the order of the connecting parts 131, 133, 135, 137, 139, 141, and in the order of the connecting parts 132, 134, 136, 138, 140, 142. Also, the gaps in the intersecting direction are narrower than those in the above-mentioned thin-film coil 110.

When arranged at such positions, the connecting parts 131 to 142 are shifted from each other in both of the direction along the air bearing surface 30 and the intersecting direction. In such manner, the thin-film coil in the first modified example can secure a wide area for arranging insulating films 20, 23, 27 about each of the connecting part.

In the above-mentioned thin-film coil 110, the connecting parts 131 to 142 are arranged at positions equally distanced from the air bearing surface 30 and thus interfere with each other, thereby making it harder to secure a wide area for arranging the insulating films 20, 23, 27. Therefore, it is difficult for the insulating films 20, 23, 27 to fully enter between the adjacent connecting parts, whereby voids may occur. In this case, a plating solution or the like used for forming the second conductor group 120 may enter the voids and deteriorate the insulation of outer conductor parts, thereby lowering the reliability of the thin-film magnetic head. By contrast, the thin-film coil in the first modified example secures a wide area for arranging the insulating films 20, 23, 27 about each connecting part, so that the insulating films 20, 23, 27 fully enter between the adjacent connecting parts, thereby excluding the fear of generating voids.

Side portions of the inner conductor parts 113 to 116 are curved except for the side portion of the inner conductor part 113 on the air bearing surface 30 side. These side portions are curved in conformity to side face forms of the protrusion 32b in the third magnetic pole part 10c, i.e., have curved surface forms conforming to the side face form of a cylindrical column (arc-like curves in FIGS. 26 and 27).

Side portions of the outer conductor part 122 in the first modified example have forms different from those in the thin-film coil 110, whereas respective side portions of the outer conductor parts 123 to 126 are curved like the inner conductor parts 113 to 116 except for the side portion of the outer conductor part 123 on the air bearing surface 30 side. When the side portions of the inner conductor parts 113 to 116 and outer conductor parts 123 to 126 are thus curved in conformity to the side face forms of the protrusion 32b, path widths of the inner conductor parts 113 to 116 and outer conductor parts 123 to 126 change gradually. Therefore, currents can flow smoothly in the inner conductor parts 113 to 116 and outer conductor parts 123 to 126, thereby suppressing the increase in ohmic value. Also, as compared with the thin-film coil 110, photolithography for forming the inner conductor parts 113 to 116 and outer conductor parts 123 to 126 becomes easier, whereby they can attain finer forms.

SECOND MODIFIED EXAMPLE

The thin-film magnetic head 300 in the second modified example is the same as that of the first embodiment except that it comprises a thin-film coil having a configuration different from that of the thin-film coil 110 and that relaxing parts are formed at different positions, and thus will be explained in terms of their differences while omitting or simplifying their common features. FIGS. 28A and 28B are sectional views similar to FIGS. 4A and 4B in the second modified example.

As shown in FIGS. 28A and 28B, the thin-film coil in this modified example comprises the first conductor group 117, second conductor group 120, and connecting part group 130, but differs from the first thin-film coil 110 in that a series of 5-turn loops are formed in total and that the second conductor group 120 has no insulating contact structure. The first conductor group 117 comprises inner conductors 111, 112, 113, 114, 115 which are in contact with each other by way of a separation insulating film 15. The second conductor group 120 comprises outer conductor parts 121, 122, 123, 124, 125, which are formed by frame plating and thus are arranged at positions separated from each other because of frames provided.

The first conductor group 117 comprises an inner relaxing part 100 between the inner conductor part 111 and the second magnetic pole part 10b as in the thin-film coil 110 and further comprises, unlike the thin-film coil 110, an inner relaxing part 105 between the inner conductor part 115 arranged on the junction 31 side and the fifth magnetic pole part 10e, whereby the first conductor group 117 is disposed between the two inner relaxing parts 100, 105. This inner relaxing part 105 is made of the same material as that of the inner relaxing part 100, and can be formed by applying a photoresist or the like to the gap 106 shown in FIG. 8A. Though not depicted, the first conductor group 117 may be formed with only the inner relaxing part 105 on the junction 31 side without forming the inner relaxing part 100.

In the foregoing thin-film coil in this modified example, the first conductor group 117 has the same insulating contact structure as that in the thin-film coil 110, and the inner conductor parts 111 to 115 are arranged with a high density, whereby those placed adjacent each other so as to push each other laterally by self-expansion are likely to influence each other. However, since the first conductor group 117 is disposed between the two relaxing parts 100, 105, the influence of self-expansion of the coil is alleviated more than in the thin-film coil 110.

In the second conductor group 120, on the other hand, the outer conductor parts are disposed at positions separated from each other, so that those adjacent each other influence each other by self-expansion less strongly than in the first conductor group 117. Therefore, the second conductor group 120 has no relaxing part. Namely, the relaxing part becomes useful only when formed in the conductor group having an insulating contact structure. The second conductor group 120 may also be provided with a relaxing part as a matter of course.

A modified example in the above-mentioned process of manufacturing the thin-film magnetic head 300 will now be explained mainly with reference to FIGS. 29A and 29B to FIGS. 31A and 31B.

MODIFIED EXAMPLE OF MANUFACTURING STEP

The manufacturing method in this modified example is the same as the above-mentioned manufacturing method in accordance with the first embodiment until the separation insulating film 15 is formed as shown in FIGS. 8A and 8B. Subsequent steps in this modified example differ from those in the first embodiment. The differences from the above-mentioned manufacturing method in accordance with the first embodiment will mainly be explained in the following, whereas explanations for their common features will be omitted or simplified.

After the step shown in FIGS. 8A and 8B, a photoresist 45 is formed on the whole surface of the laminate by a thickness of 4 to 5 µm as shown in FIGS. 29A and 29B and then is patterned with a predetermined photomask, such that the photoresist 45 is left so as to cover the inner relaxing part gap 102, gaps between the first inner conductor parts 111, 113, 115, and gap between the first inner conductor part 115 and third magnetic pole part 10c coated with the separation insulating film 15. Thereafter, an insulating film 16 made of alumina, for example, is formed by a thickness of 4 to 5 µm, for example, so as to cover the whole upper face of the laminate.

Next, as shown in FIGS. 30A and 30B, the surface covered with the insulating film 16 is polished by CMP until the photoresist 45 is exposed, so as to flatten the surface.

Subsequently, as shown in FIGS. 31A and 31B, the photoresist 45 is removed, and a photoresist is formed again or a film made of polyimide resin, SOG, or the like is selectively formed so as to cover the inner relaxing part gap 102 coated with the separation insulating film 15. This forms the inner relaxing part gap 102 with an inner relaxing part 100. Thereafter, an electrode film 17a made of Cu is formed by a thickness of about 200 to 500 angstroms on the whole surface of the laminate by sputtering or CVD, and then a conductive layer 17b made of Cu, for example, is formed by a thickness of about 3 to 5 µm. As a consequence, the conductive layer 17b is reliably buried in the inner grooves between the first inner conductor parts 111, 113, 115 and the third magnetic pole part 10c.

Subsequently, the surface covered with the conductive layer 17b is polished by CMP until the inner conductor parts 111, 113, 115 are exposed, so as to flatten the surface. As a result of the polishing, the conductive layer 17b and electrode film 17a remaining between the first inner conductor parts 111, 113, 115 and between the first inner conductor part 115 and third magnetic pole part 10c form the second inner conductor parts 112, 114, 116 as shown in FIGS. 11A and 11B. Subsequent steps are carried out as in the above-mentioned manufacturing method in accordance with the first embodiment, so that the first conductor group 117, second conductor group 120, and connecting part group 130 form the thin-film coil 110, whereby the thin-film magnetic head 300 is obtained.

Second Embodiment

Figure 32:
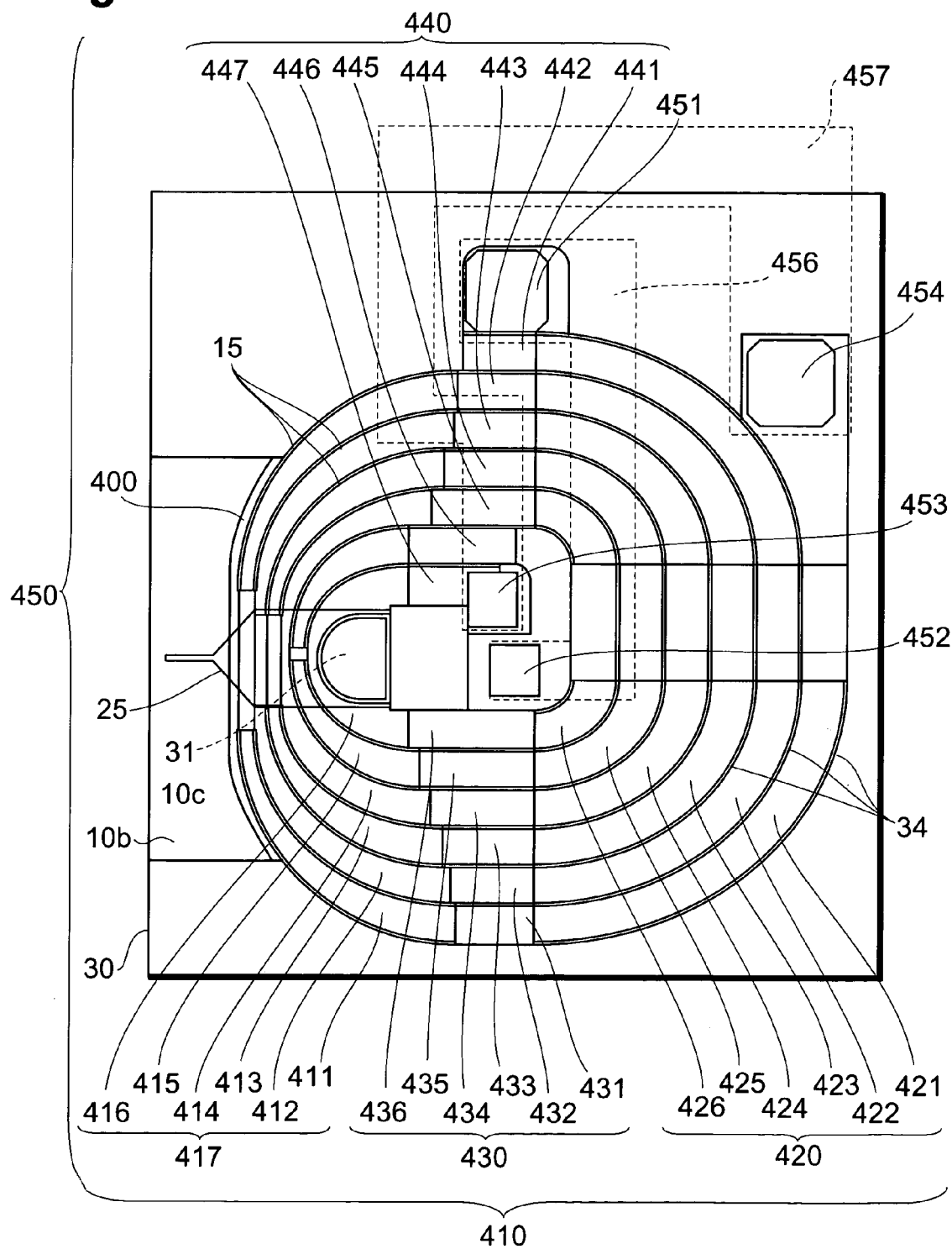
FIG. 32 is a plan view showing the thin-film magnetic head in accordance with a second embodiment of the present invention.

With reference to FIG. 32, the thin-film magnetic head in accordance with the second embodiment of the present invention will now be explained. FIG. 32 is a plan view showing the thin-film magnetic head 450 in accordance with the second embodiment of the present invention.

The thin-film magnetic head 450 in accordance with the second embodiment comprises a reproducing head and a recording head (inductive electromagnetic transducer) laminated on an undepicted substrate, and an air bearing surface 30. The thin-film magnetic head 450 differs from the thin-film magnetic head 300 mainly in the configuration of a thin-film coil 410 in the recording head.

As in the thin-film magnetic head 300, the recording head has a configuration in which a lower magnetic pole layer, an upper magnetic pole layer 25, a recording gap layer, and the thin-film coil 410 are laminated on the substrate. As in the thin-film magnetic head 300, the lower magnetic pole layer and upper magnetic pole layer 25 include magnetic pole parts (opposing magnetic pole parts) opposing each other on the air bearing surface 30 side, and are magnetically connected to each other with a junction which is not depicted. A recording gap layer is formed between the opposing magnetic pole part of the lower magnetic pole layer and the opposing magnetic pole part of the upper magnetic pole layer 25. For convenience of illustration, FIG. 32 omits the recording gap layer, and shows only the second magnetic pole part 10b and third magnetic pole part 10c in the lower magnetic pole layer.

In a state insulated from the lower magnetic pole layer and upper magnetic pole layer 25, the thin-film coil 410 circulates about the junction 31 connecting the lower magnetic pole layer and upper magnetic pole layer 25 to each other, and is flatly spirally wound about the junction 31. The thin-film coil 410 comprises a first conductor group 417, a second conductor group 420, a connecting part group 430, and a connecting part group 440, which are connected to each other, so as to form a series of 6-turn loops.

The first conductor group 417 comprises first inner conductor parts 411, 413, 415 and second inner conductor parts 412, 414, 416 which are arranged between the lower magnetic pole layer and upper magnetic pole layer 25, and has an insulating contact structure in which those adjacent each other in the inner conductor parts 411 to 416 are in contact with each other by way of a separation insulating film 15. By way of the separation insulating film 15, the inner conductor part 411 is in contact with an inner relaxing part 400 which will be explained later.

Side portions of the inner conductor parts 411 to 416 are curved in conformity to side face forms of a protrusion in the third magnetic pole part 10c. The inner conductor parts 411 to 416 have a variable width structure in which their path widths gradually increase from the portion corresponding to the upper magnetic pole layer 25 to the outside thereof, so that the narrowest part is located at a position corresponding to the protrusion of the third magnetic pole part 10c.

The second conductor group 420 comprises first outer conductor parts 422, 424, 426 and second outer conductor parts 421, 423, 425 disposed on the same plane as the first conductor group 417 on the outside of the junction 31, and has an insulating contact structure in which those adjacent each other are in contact with each other by way of a separation insulating film 34.

Together with the inner conductor parts 411 to 416, the outer conductor parts 421 to 426 are curved so as to form circulating paths about the junction 31, while having substantially the same path width.

The connecting part group 430 comprises a plurality of connecting parts 431 to 436. The connecting parts 431 to 436 are provided for connecting the inner conductor parts 411 to 416 to the outer conductor parts 421 to 426, and are arranged along the air bearing surface 30 at the outside of the upper magnetic pole layer 25 in the following manner. Namely, the connecting parts 431, 432, 433, 434, 435, 436 are provided so as to connect the outer conductor parts 421 to 426 to the inner conductor parts 411 to 416, respectively.

The connecting part group 440 comprises a plurality of connecting parts 441 to 447. The connecting parts 442 to 445 are provided for connecting the inner conductor parts 411, 412, 413, 414 to the outer conductor parts 423, 424, 425, 426, respectively. The connecting part 441 connects the outer conductor part 422 to a terminal part 451. The connecting part 446 connects the inner conductor part 415 to a terminal part 452. The connecting part 447 connects the inner conductor part 416 to a terminal part 453.

In the thin-film coil 410, the outer conductor part 421 connects with the inner conductor part 411 by way of the connecting part 431, and the inner conductor part 411 connects with the outer conductor part 423 by way of the connecting part 442, whereby a 1-turn loop is formed. The outer conductor part 423 connects with the inner conductor part 413 by way of the connecting part 433, the inner conductor part 413 connects with the outer conductor part 425 by way of the connecting part 444, and the outer conductor part 425 connects with the inner conductor part 415 by way of the connecting part 434 and with the terminal part 452 by way of the connecting part 446, whereby 2-turn loops are formed.

The terminal part 452 connects with the terminal part 451 by way of a lead part 456, and the terminal part 451 connects with the outer conductor part 422 by way of the connecting part 441. The outer conductor part 422 connects with the inner conductor part 412 by way of the connecting part 432, and the inner conductor part 412 connects with the outer conductor part 424 by way of the connecting part 443, whereby a 1-turn loop is formed again. The outer conductor part 424 connects with the inner conductor part 414 by way of the connecting part 434, the inner conductor part 414 connects with the outer conductor part 426 by way of the connecting part 445, the outer conductor part 426 connects with the inner conductor part 416 by way of the connecting part 436, and the inner conductor part 416 connects with the terminal part 453 by way of the connecting part 447, whereby 2-turn loops are formed. The terminal part 453 connects with a terminal part 454 by way of a lead part 457. The terminal part 454 is connected to an external electrode pad which is not depicted.

The relaxing part 400 is made of the same material as that of the inner relaxing part 100, and is arranged so as to be in contact by way of the separation insulating film 15 with the inner conductor part 411 disposed on the air bearing surface 30 side as shown in FIG. 32.

In the thin-film magnetic head 450, as in the foregoing, the thin-film coil 410 has an insulating contact structure, so that the inner conductor parts 411 to 416 constituting the first conductor group 417 are in contact with each other by way of the separation insulating film 15, whereas the outer conductor parts 421 to 426 constituting the second conductor group 420 are in contact with each other by way of the separation insulating film 34. As a consequence, the inner conductor parts 411 to 416 and the outer conductor parts 421 to 426 are arranged with a high density with substantially no gaps between those adjacent each other. Therefore, the yoke length can be shortened without narrowing the path widths of the inner and outer conductor parts so much. Also, since it is not necessary for the inner and outer conductor parts to narrow their path widths so much, current flows are obstructed less, whereby the rise in ohmic value is suppressed.

Also, the relaxing part 400 formed between the inner conductor part 411 and the second magnetic pole part 10b can absorb the broadening of the width upon self-expansion of the thin-film coil 410 if any. Therefore, as with the thin-film magnetic head 300, the thin-film magnetic head 450 can further shorten the yoke length while keeping the number of turns, since the magnetic pole part does not project toward the recording medium even when the thin-film coil 410 is apt to cause self-expansion as the turn width decreases.

OTHER MODIFIED EXAMPLES

Without being restricted to the above-mentioned embodiments, the present invention can be modified as appropriate. For example, though the thin-film coil 110 is set to 6-turns or 5-turns, and the thin-film coil 410 is set to 6-turns, the number of turns of the thin-film coil can be selected as appropriate.

Also, in the first embodiment, a thin-film coil having a desirable number of turns can be made by using a semifinished product (thin-film magnetic head basic structure) having fabricated at least up to the first conductor group. In this case, the number of turns of the thin-film coil may be selected by changing both of the form of each connecting part and the number of the outer conductor parts.

The present invention is also applicable to a write-only head having only an inductive electromagnetic transducer, and to a thin-film magnetic head which carries out recording and reproducing by using an inductive electromagnetic transducer.

EMBODIMENTS OF HEAD GIMBAL ASSEMBLY AND HARD DISK DRIVE

Embodiments of head gimbal assembly and hard disk drive will now be explained.

Figure 33:
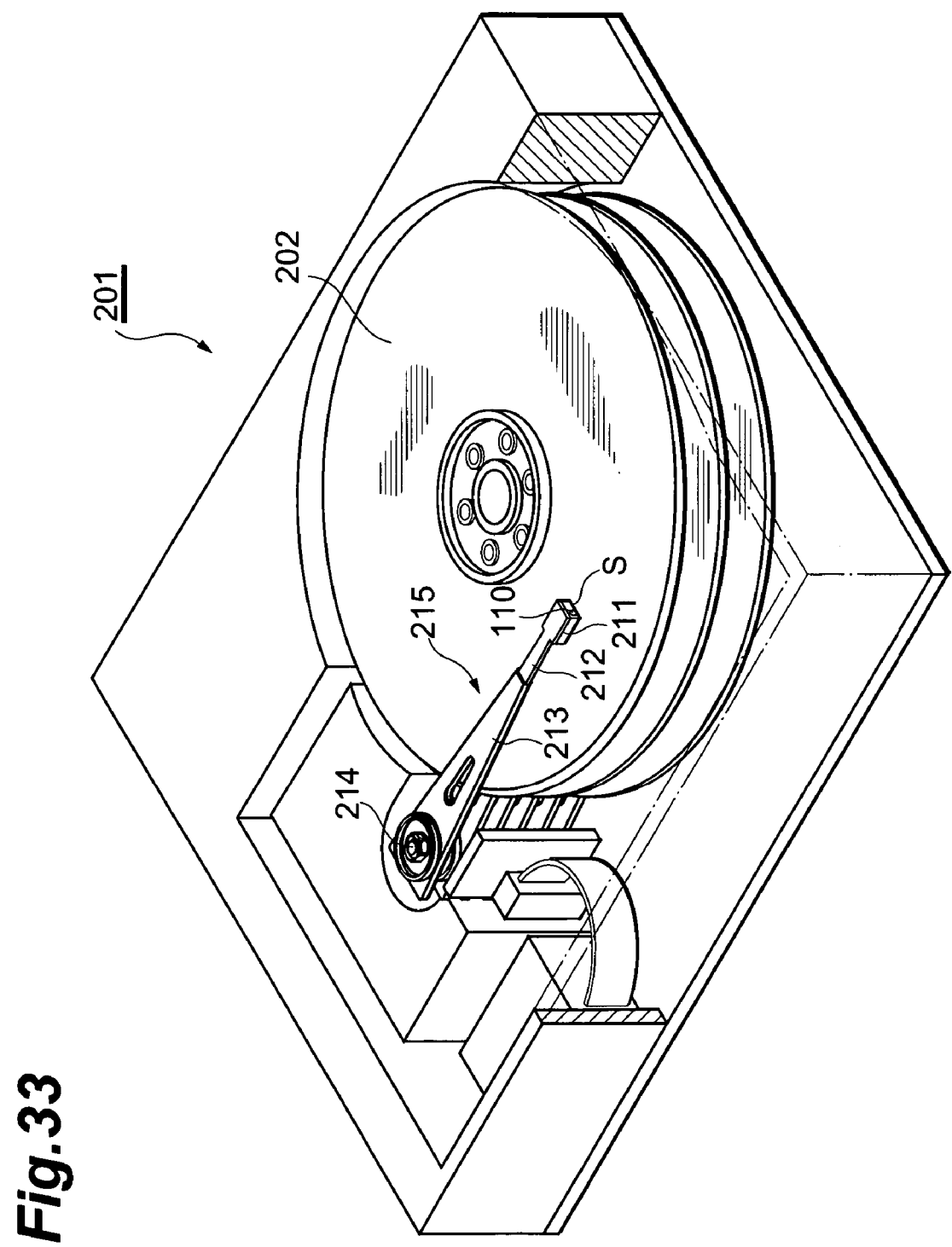
FIG. 33 is a perspective view showing a hard disk drive comprising the thin-film magnetic head in accordance with the first embodiment of the present invention.

FIG. 33 is a perspective view showing a hard disk drive 201 comprising the above-mentioned thin-film magnetic head 110. The hard disk drive 201 comprises a hard disk (recording medium) 202 rotating at a high speed, and a head gimbal assembly (HGA) 215. The hard disk drive 201 is an apparatus for actuating the HGA 215, so that magnetic information is recorded onto and reproduced from recording surfaces of the hard disk 202. The hard disk 202 comprises a plurality of disks (whose number is 3 in the drawing). Each disk has a recording surface opposing the thin-film magnetic head 110. The HGA 215 comprises a gimbal 212 mounted with a head slider 211 having a support formed with the thin-film magnetic head 110 and a suspension arm 213 for supporting the gimbal 212 which are disposed on the recording surface of each disk, and is rotatable about a shaft 214 by a voice coil motor which is not depicted, for example. As the HGA 215 is rotated, the head slider 211 moves radially of the hard disk 202, i.e., in directions traversing track lines.

Such HGA 215 and hard disk drive 201 have excellent recording characteristics in high frequency bands, since each of them comprises the thin-film magnetic head 110. The HGA 215 and hard disk drive 201 exhibit similar excellent recording characteristics in a high frequency band also when they comprise the thin-film magnetic head in accordance with any of the modified examples in the first embodiment and the thin-film magnetic head in accordance with the second embodiment.

It is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thin-film magnetic head comprising a configuration in which first and second magnetic pole groups, magnetically connected to each other, having respective magnetic pole parts opposing each other on a side of a medium-opposing surface opposing a recording medium; a recording gap layer formed between the magnetic pole parts; and a thin-film coil insulated from the first and second magnetic pole groups and wound helically about at least one of the first and second magnetic pole groups or flatly spirally wound about a junction connecting the first and second magnetic pole groups to each other are laminated on a substrate;

wherein the thin-film coil comprises a first conductor group having a plurality of inner conductor parts disposed between the first and second magnetic pole groups, a second conductor group having a plurality of outer conductor parts disposed outside the second magnetic pole group or junction, and a connecting part group having respective connecting parts for connecting the inner conductor parts to the outer conductor parts;

wherein the first conductor group has an insulating contact structure in which the inner conductor parts are in contact with each other by way of an insulating film; and wherein an inner relaxing part comprising a material softer than at least one of the first, second conductor groups and the first, second magnetic pole groups and being in contact with the first conductor group by way of an insulating film is provided.

2. A thin-film magnetic head according to claim 1, wherein the inner relaxing part is arranged between the inner conductor part disposed on the medium-opposing surface side and the first magnetic pole group.

3. A thin-film magnetic head according to claim 2, wherein the inner relaxing part is further provided between the inner conductor part disposed on the junction side and the first magnetic pole group.

4. A thin-film magnetic head according to claim 1, wherein the second conductor group has an insulating contact structure in which the outer conductor parts are in contact with each other by way of an insulating film; and wherein an outer relaxing part comprising a material softer than at least one of the first, second conductor groups and the first, second magnetic pole groups and being in contact with the second conductor group by way of an insulating film is provided.

5. A thin-film magnetic head according to claim 4, wherein the outer relaxing part is arranged between the outer conductor part disposed on the medium-opposing surface side and the medium-opposing surface.

6. A thin-film magnetic head according to claim 4, wherein, in the first and second conductor groups, respective densities of arrangements of inner and outer conductor parts in a direction intersecting the medium-opposing surface increase from the outside of the second magnetic pole group to the second magnetic pole group.

7. A thin-film magnetic head according to claim 4, wherein the inner and outer conductor parts have a variable width structure in which a path width gradually increases from a part corresponding to the second magnetic pole group to the outside thereof.

8. A thin-film magnetic head according to claim 7, wherein the first magnetic pole group has a protrusion projecting toward the medium-opposing surface.

9. A thin-film magnetic head according to claim 8, wherein each of the inner and outer conductor parts has a narrowest part with the narrowest path width at a location corresponding to the protrusion.

10. A thin-film magnetic head according to claim 8, wherein the protrusion has a curved surface projecting toward the medium-opposing surface.

11. A thin-film magnetic head according to claim 10, wherein each of the inner and outer conductor parts is curved in conformity to a side face form of the protrusion.

12. A method of manufacturing a thin-film magnetic head by laminating first and second magnetic pole groups, magnetically connected to each other, having respective magnetic pole parts opposing each other on a side of a medium-opposing surface opposing a recording medium; a recording gap layer formed between the magnetic pole parts; and a thin-film coil insulated from the first and second magnetic pole groups and wound helically about at least one of the first and second magnetic pole groups on a substrate, the method comprising the steps of:
    forming a plurality of inner conductor parts and a lower connecting layer in contact by way of an insulating film on a first magnetic pole layer disposed on the substrate and a second magnetic pole layer disposed at a location for determining a yoke length with a relaxing part gap adjoining the first inner conductor parts;
    forming inner grooves covered with a separation insulating film between the second magnetic pole layer and adjacent first inner conductor parts and at the relaxing part gap;
    forming each inner groove with an inner relaxing part made of a material softer than at least one of the first inner conductor part and second magnetic pole layers and a second inner conductor part, and forming a first conductor group by the first and second inner conductor parts;
    forming a first magnetic pole group by laminating a third magnetic pole layer on the second magnetic pole layer;
    forming a second magnetic pole group on the first magnetic pole group so as to provide the recording gap layer;
    forming a connecting part group by disposing an upper connecting layer on the lower connecting layer;
    forming a plurality of first outer conductor parts in contact with the second magnetic pole group by way of an insulating film, and an insulating part disposed at the position for determining the yoke length;
    forming outer grooves covered with a separation insulating film between the insulating part and the first outer conductor parts adjacent each other;
    forming each outer groove with a second outer conductor part, and forming a second conductor group by the first and second outer conductor parts; and
    forming the thin-film coil by the first and second outer conductor groups and the connecting part group.

13. A method of manufacturing a thin-film magnetic head by laminating first and second magnetic pole groups, magnetically connected to each other, having respective magnetic pole parts opposing each other on a side of a medium-opposing surface opposing a recording medium; a recording gap layer formed between the magnetic pole parts; and a thin-film coil insulated from the first and second magnetic pole groups and wound helically about at least one of the first and second magnetic pole groups on a substrate, the method comprising the steps of:
    forming a plurality of inner conductor parts and a lower connecting layer in contact by way of an insulating film on a first magnetic pole layer disposed on the substrate and a second magnetic pole layer disposed at a location for determining a yoke length with a inner relaxing part gap adjoining the first inner conductor parts;
    forming inner grooves covered with a separation insulating film between the second magnetic pole layer and adjacent first inner conductor parts and at the inner relaxing part gap;
    forming each inner groove with an inner relaxing part made of a material softer than at least one of the first inner conductor part and second magnetic pole layers and a second inner conductor part, and forming a first conductor group by the first and second inner conductor parts;
    forming a first magnetic pole group by laminating a third magnetic pole layer on the second magnetic pole layer;
    forming a second magnetic pole group on the first magnetic pole group so as to provide the recording gap layer;
    forming a connecting part group by disposing an upper connecting layer on the lower connecting layer;
    forming a plurality of first outer conductor parts in contact with the second magnetic pole group by way of an insulating film, and an insulating part disposed at the position for determining the yoke length, while providing an outer relaxing part gap adjacent the first outer conductor parts;
    forming outer grooves covered with a separation insulating film between the insulating part and the first outer conductor parts adjacent each other and at the outer relaxing part gap;
    forming each outer groove with an outer relaxing part made of a material softer than the first outer conductor parts, and a second outer conductor part, and forming a second conductor group by the first and second outer conductor parts; and
    forming the thin-film coil by the first and second outer conductor groups and the connecting part group.

14. A method of manufacturing a thin-film magnetic head according to claim 13, wherein each of the first and second inner conductor parts and first and second outer conductor parts is formed by plating.

15. A method of manufacturing a thin-film magnetic head according to claim 13, wherein the second inner conductor parts and second outer conductor parts are formed by manufacturing an electrode film by sputtering and plating a conductive layer on the electrode film.

16. A method of manufacturing a thin-film magnetic head according to claim 13, wherein the separation insulating film is formed by laminating a plurality of alumina films.

17. A head gimbal assembly comprising a thin-film magnetic head formed on a support, and a gimbal securing the support;
    the thin-film magnetic head comprising a configuration in which first and second magnetic pole groups, magnetically connected to each other, having respective magnetic pole parts opposing each other on a side of a medium-opposing surface opposing a recording medium; a recording gap layer formed between the magnetic pole parts; and a thin-film coil insulated from the first and second magnetic pole groups and wound helically about at least one of the first and second magnetic pole groups or flatly spirally wound about a junction connecting the first and second magnetic pole groups to each other are laminated on a substrate;
    wherein the thin-film coil comprises a first conductor group having a plurality of inner conductor parts disposed between the first and second magnetic pole groups, a second conductor group having a plurality of outer conductor parts disposed outside the second magnetic pole group or junction, and a connecting part group having respective connecting parts for connecting the inner conductor parts to the outer conductor parts;

wherein the first conductor group has an insulating contact structure in which the inner conductor parts are in contact with each other by way of an insulating film; and wherein an inner relaxing part comprising a material softer than at least one of the first, second conductor groups and the first, second magnetic pole groups and being in contact with the first conductor group by way of an insulating film is provided.

18. A hard disk drive comprising a head gimbal assembly including a thin-film magnetic head, and a recording medium opposing the thin-film magnetic head;

the thin-film magnetic head comprising a configuration in which first and second magnetic pole groups, magnetically connected to each other, having respective magnetic pole parts opposing each other on a side of a medium-opposing surface opposing a recording medium; a recording gap layer formed between the magnetic pole parts; and a thin-film coil insulated from the first and second magnetic pole groups and wound helically about at least one of the first and second magnetic pole groups or flatly spirally wound about a junction connecting the first and second magnetic pole groups to each other are laminated on a substrate;

wherein the thin-film coil comprises a first conductor group having a plurality of inner conductor parts disposed between the first and second magnetic pole groups, a second conductor group having a plurality of outer conductor parts disposed outside the second magnetic pole group or junction, and a connecting part group having respective connecting parts for connecting the inner conductor parts to the outer conductor parts;

wherein the first conductor group has an insulating contact structure in which the inner conductor parts are in contact with each other by way of an insulating film; and wherein an inner relaxing part comprising a material softer than at least one of the first, second conductor groups and the first, second magnetic pole groups and being in contact with the first conductor group by way of an insulating film is provided.

* * * * *